US012727050B2

(12) United States Patent
Agiwal et al.

(10) Patent No.: US 12,727,050 B2
(45) Date of Patent: Sep. 1, 2026

(54) RADIO RESOURCE CONTROL RE-ESTABLISHMENT

(71) Applicant: Samsung Electronics Co., Ltd., Suwon-si (KR)

(72) Inventors: Anil Agiwal, Allen, TX (US); Shiyang Leng, Allen, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 18/634,590

(22) Filed: Apr. 12, 2024

(65) Prior Publication Data

US 2024/0373490 A1 Nov. 7, 2024

Related U.S. Application Data

(60) Provisional application No. 63/537,063, filed on Sep. 7, 2023, provisional application No. 63/463,468, filed on May 2, 2023.

(51) Int. Cl.
*H04W 36/00* (2009.01)
*H04L 5/00* (2006.01)
(Continued)

(52) U.S. Cl.
CPC ........... *H04W 76/19* (2018.02); *H04W 76/27* (2018.02)

(58) Field of Classification Search
None
See application file for complete search history.

(56) References Cited

U.S. PATENT DOCUMENTS 10,986,678 B2 * 4/2021 Li ........................ H04W 56/001
11,736,986 B2 * 8/2023 Kung ................ H04W 28/0278 370/331

(Continued)

FOREIGN PATENT DOCUMENTS

WO 2024232818 A1 11/2024
WO 2025029056 A1 2/2025

OTHER PUBLICATIONS

"5G; NR; Medium Access Control (MAC) protocol specification (3GPP TS 38.321 version 17.4.0 Release 17)", ETSI TS 138 321 V17.4.0, Apr. 2023, 254 pages.

(Continued)

*Primary Examiner* — Sithu Ko

(57) ABSTRACT

A user equipment (UE) includes a transceiver configured to receive a message including a layer 1/layer 2 (L1/L2)-triggered mobility (LTM) configuration. The LTM configuration includes a plurality of LTM candidate cells. The UE further includes a processor operably coupled to the transceiver. The processor is configured to determine that a T304 timer or a T310 timer has expired, and based on the determination that the T304 timer or the T310 timer has expired, initiate a radio resource control (RRC) re-establishment procedure and start an RRC reestablishment (T311) timer. The processor is further configured to, while the T311 timer is running, select a cell, determine whether the LTM configuration includes an indication to perform LTM cell switch to the selected cell, and determine whether the selected cell is one of the plurality of LTM candidate cells in the LTM configuration.

16 Claims, 19 Drawing Sheets

(51) Int. Cl.

| | |
|---|---|
| ***H04W 74/04*** | (2009.01) |
| ***H04W 76/19*** | (2018.01) |
| ***H04W 76/27*** | (2018.01) |

(56) References Cited

U.S. PATENT DOCUMENTS

| | | | | |
|---|---|---|---|---|
| 2019/0089579 | A1* | 3/2019 | Sang | H04W 36/305 |
| 2020/0344019 | A1* | 10/2020 | Da Silva | H04W 24/04 |
| 2021/0195547 | A1 | 6/2021 | Pezeshki et al. | |
| 2023/0040285 | A1* | 2/2023 | Parichehrehteroujeni | H04W 36/0079 |
| 2023/0126466 | A1* | 4/2023 | Pan | H04W 76/23 455/11.1 |
| 2023/0388891 | A1* | 11/2023 | Wu | H04W 36/00692 |
| 2024/0276316 | A1* | 8/2024 | Akl | H04W 36/32 |
| 2024/0349129 | A1* | 10/2024 | Jung | H04W 36/0009 |

OTHER PUBLICATIONS

International Search Report and Written Opinion issued Aug. 8, 2024 regarding International Application No. PCT/KR2024/005958, 9 pages.

LG Electronics Inc., "Discussion on LTM timer operation", 3GPP TSG-RAN WG2 Meeting #121bis, R2-2303752, Apr. 2023, 5 pages.

NEC, "Failure Handling for L1/L2 Triggered Mobility", 3GPP TSG-RAN WG2 Meeting #121bis-e, R2-2302485, Apr. 2023, 4 pages.

Apple, "LTM cell switch linkfailure handling", 3GPP TSG-RAN WGZ Meeting #121bis-e, R2-2303395, Apr. 2023, 5 pages.

CMCC, "Considerations on failure handling", 3GPP TSG-RAN WG2 #121-bis-e, R2-2303535, Apr. 2023, 3 pages.

Supplementary European Search Report dated Jun. 2, 2026, in connection with European Patent Application No. 24800241.2, 17 pages.

Huawei et al., "Summary of [AT121bis-e] [018] [eMob] Procedure Consolidation (Huawei)," R2-2304214, 3GPP TSG-RAN WG2 Meeting #121 -bis, electronic, Apr. 17-26, 2023, 41 pages.

* cited by examiner

RADIO RESOURCE CONTROL RE-ESTABLISHMENT

CROSS-REFERENCE TO RELATED APPLICATIONS AND CLAIM OF PRIORITY

This application claims priority under 35 U.S.C. § 119(e) to U.S. Provisional Patent Application No. 63/463,468 filed on May 2, 2023, and U.S. Provisional Patent Application No. 63/537,063 filed on Sep. 7, 2023. The above-identified provisional patent applications are hereby incorporated by reference in their entirety.

TECHNICAL FIELD

This disclosure relates generally to wireless networks. More specifically, this disclosure relates to apparatuses and methods for handling radio resource control re-establishment.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides apparatuses and methods for handling radio resource control re-establishment.

In one embodiment, a user equipment (UE) is provided. The UE includes a transceiver configured to receive a message including a layer 1/layer 2 (L1/L2)-triggered mobility (LTM) configuration. The LTM configuration includes a plurality of LTM candidate cells. The UE further includes a processor operably coupled to the transceiver. The processor is configured to determine that a T304 timer or a T310 timer has expired, and based on the determination that the T304 timer or the T310 timer has expired, initiate a radio resource control (RRC) re-establishment procedure and start an RRC reestablishment (T311) timer. The processor is further configured to, while the T311 timer is running, select a cell, determine whether the LTM configuration includes an indication to perform LTM cell switch to the selected cell, and determine whether the selected cell is one of the plurality of LTM candidate cells in the LTM configuration.

In another embodiment, a base station (BS) is provided. The BS includes a processor, and a transceiver operably coupled to the processor. The transceiver is configured to transmit a message including a LTM configuration. The LTM configuration includes a plurality of LTM candidate cells. The transceiver is further configured to receive an RRC reestablishment request message.

In yet another embodiment, a method of operating a UE is provided. The method includes receiving a message including a LTM configuration. The LTM configuration includes a plurality of LTM candidate cells. The method further includes determining that a T304 timer or a T310 timer has expired, and based on the determination that the T304 timer or the T310 timer has expired, RRC re-establishment procedure and starting a T311 timer. The method further includes, while the T311 timer is running, selectin a cell, determining whether the LTM configuration includes an indication to perform LTM cell switch to the selected cell; and determining whether the selected cell is one of the plurality of LTM candidate cells in the LTM configuration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 18, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-3B below describe various embodiments implemented in wireless communications systems and with the use of orthogonal frequency division multiplexing (OFDM) or orthogonal frequency division multiple access (OFDMA) communication techniques. The descriptions of FIGS. 1-3B are not meant to imply physical or architectural limitations to the manner in which different embodiments may be implemented. Different embodiments of the present disclosure may be implemented in any suitably arranged communications system.

Figure 1:
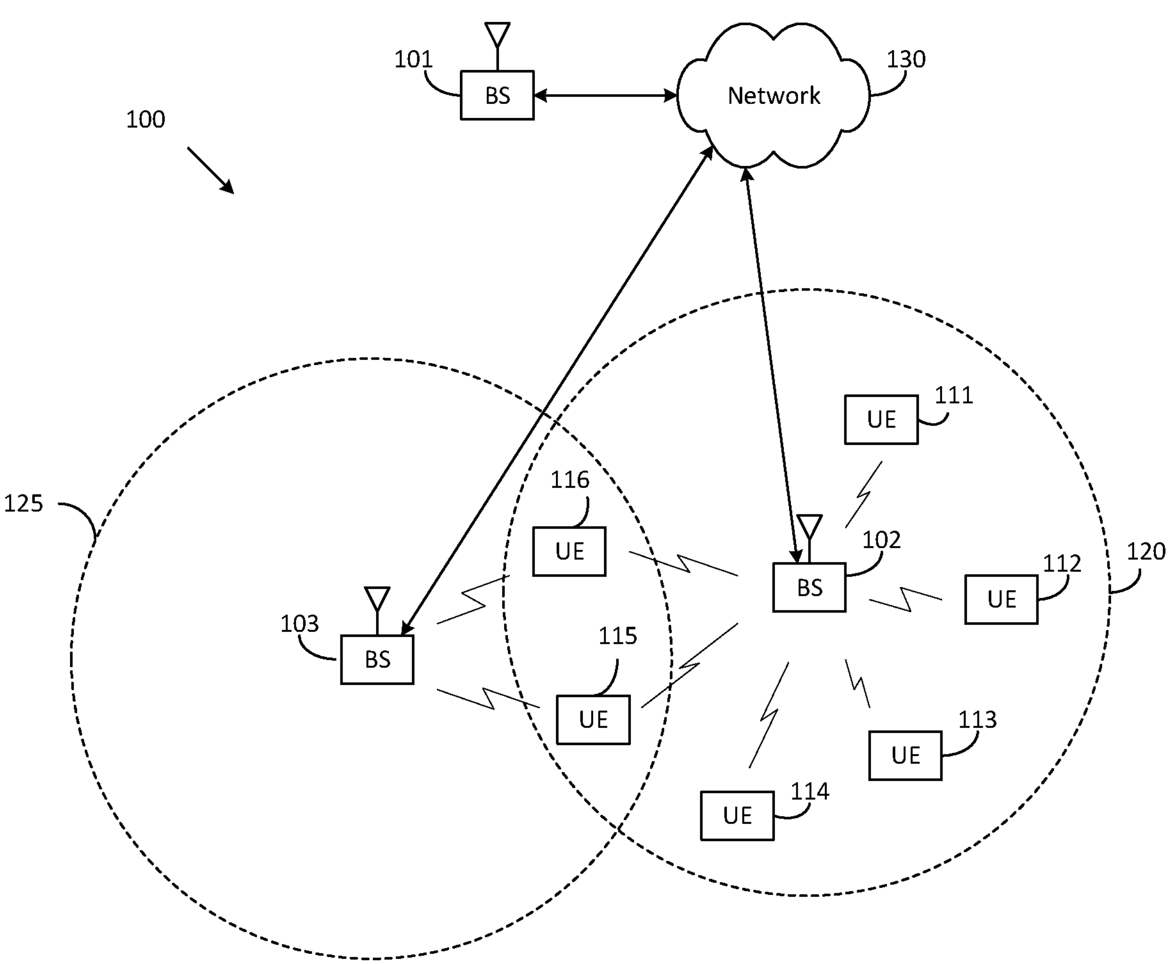
FIG. 1 illustrates an example wireless network according to embodiments of the present disclosure.

FIG. 1 illustrates an example wireless network 100 according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, longterm evolution (LTE), longterm evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for handling radio resource control re-establishment. In certain embodiments, one or more of the gNBs 101-103 includes circuitry, programing, or a combination thereof, to support radio resource control re-establishment in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2A:
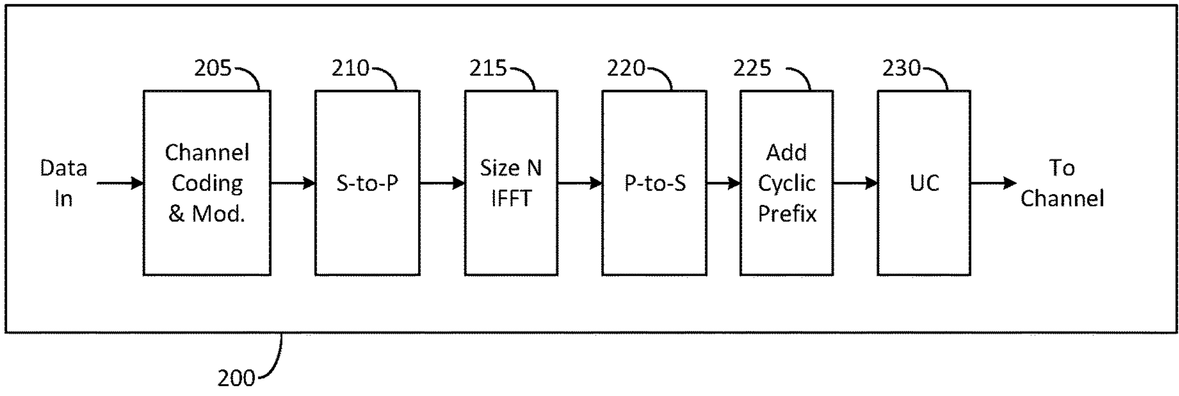
FIGS. 2A and 2B illustrate example wireless transmit and receive paths according to embodiments of the present disclosure.
Figure 2B:
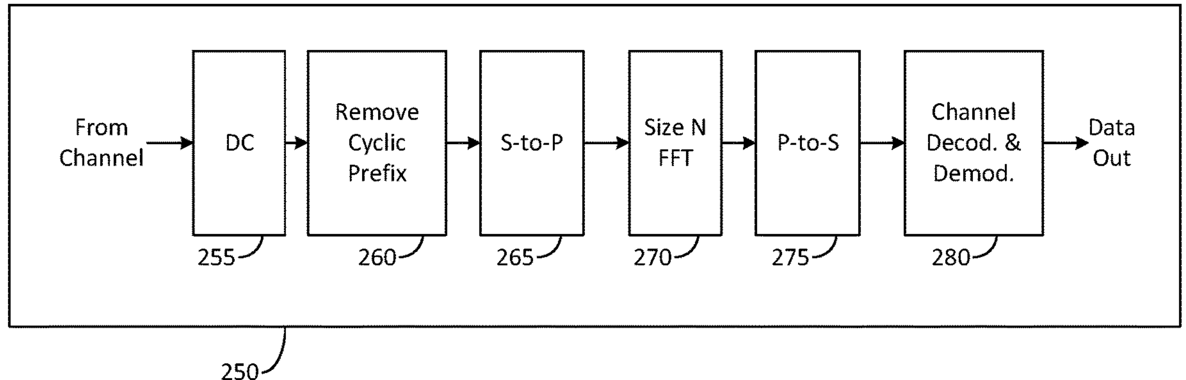

FIGS. 2A and 2B illustrate example wireless transmit and receive paths according to embodiments of the present disclosure. In the following description, a transmit path 200 may be described as being implemented in a gNB (such as gNB 102), while a receive path 250 may be described as being implemented in a UE (such as UE 116). However, it will be understood that the receive path 250 can be implemented in a gNB and that the transmit path 200 can be implemented in a UE.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3A:
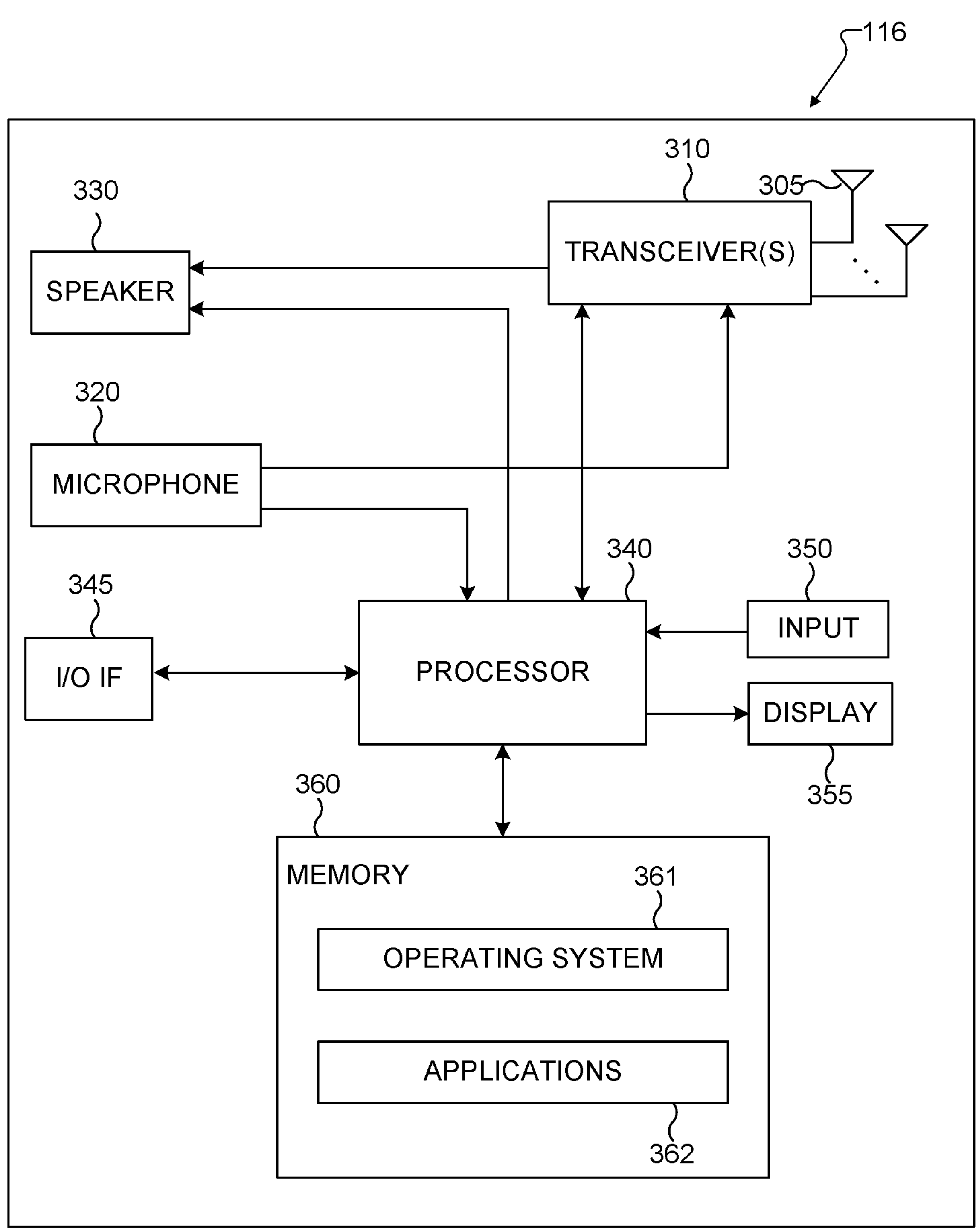
FIG. 3A illustrates an example UE according to embodiments of the present disclosure.

FIG. 3A illustrates an example UE 116 according to embodiments of the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

As shown in FIG. 3A, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the ULE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for handling radio resource control re-establishment as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3A illustrates the UE 116 configured as a mobile telephone or smartphone, UEs could be configured to operate as other types of mobile or stationary devices.

Figure 3B:
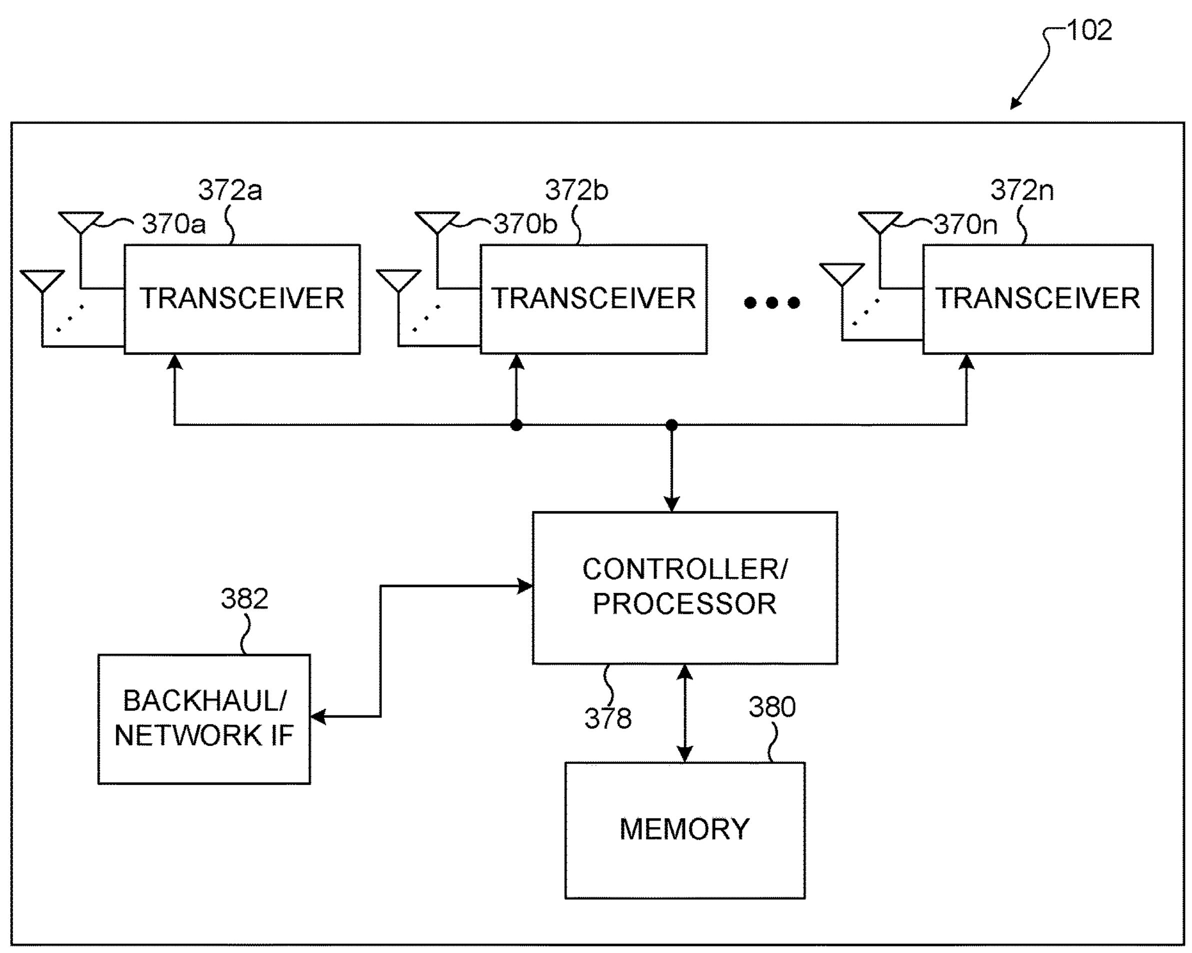
FIG. 3B illustrates an example gNB according to embodiments of the present disclosure.

FIG. 3B illustrates an example gNB 102 according to embodiments of the present disclosure. The embodiment of the gNB 102 illustrated in FIG. 3B is for illustration only, and the gNBs 101 and 103 of FIG. 1 could have the same or similar configuration. However, gNBs come in a wide variety of configurations, and FIG. 3B does not limit the scope of this disclosure to any particular implementation of a gNB.

As shown in FIG. 3B, the gNB 102 includes multiple antennas 370*a*-370*n*, multiple transceivers 372*a*-372*n*, a controller/processor 378, a memory 380, and a backhaul or network interface 382.

The transceivers 372*a*-372*n* receive, from the antennas 370*a*-370*n*, incoming RF signals, such as signals transmitted by UEs in the network 100. The transceivers 372*a*-372*n* down-convert the incoming RF signals to generate IF or baseband signals. The IF or baseband signals are processed by receive (RX) processing circuitry in the transceivers 372*a*-372*n* and/or controller/processor 378, which generates processed baseband signals by filtering, decoding, and/or digitizing the baseband or IF signals. The controller/processor 378 may further process the baseband signals.

Transmit (TX) processing circuitry in the transceivers 372*a*-372*n* and/or controller/processor 378 receives analog or digital data (such as voice data, web data, e-mail, or interactive video game data) from the controller/processor 378. The TX processing circuitry encodes, multiplexes, and/or digitizes the outgoing baseband data to generate processed baseband or IF signals. The transceivers 372*a*-372*n* up-converts the baseband or IF signals to RF signals that are transmitted via the antennas 370*a*-370*n*.

The controller/processor 378 can include one or more processors or other processing devices that control the overall operation of the gNB 102. For example, the controller/processor 378 could control the reception of uplink (UL) channel signals and the transmission of downlink (DL) channel signals by the transceivers 372*a*-372*n* in accordance with well-known principles. The controller/processor 378 could support additional functions as well, such as more advanced wireless communication functions. For instance, the controller/processor 378 could support beam forming or directional routing operations in which outgoing/incoming signals from/to multiple antennas 370*a*-370*n* are weighted differently to effectively steer the outgoing signals in a desired direction. Any of a wide variety of other functions could be supported in the gNB 102 by the controller/processor 378.

The controller/processor 378 is also capable of executing programs and other processes resident in the memory 380, such as an OS and, for example, processes to support radio resource control re-establishment as discussed in greater detail below. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 could support communications over any suitable wired or wireless connection(s). For example, when the gNB 102 is implemented as part of a cellular communication system (such as one supporting 5G/NR, LTE, or LTE-A), the interface 382 could allow the gNB 102 to communicate with other gNBs over a wired or wireless backhaul connection. When the gNB 102 is implemented as an access point, the interface 382 could allow the gNB 102 to communicate over a wired or wireless local area network or over a wired or wireless connection to a larger network (such as the Internet). The interface 382 includes any suitable structure supporting communications over a wired or wireless connection, such as an Ethernet or transceiver.

The memory 380 is coupled to the controller/processor 378. Part of the memory 380 could include a RAM, and another part of the memory 380 could include a Flash memory or other ROM.

Although FIG. 3B illustrates one example of gNB 102, various changes may be made to FIG. 3B. For example, the gNB 102 could include any number of each component shown in FIG. 3B. Also, various components in FIG. 3B could be combined, further subdivided, or omitted and additional components could be added according to particular needs.

In the fifth-generation wireless communication system operating in higher frequency (mmWave) bands, UEs and gNBs communicate with each other using beamforming. beamforming techniques are used to mitigate propagation path losses and to increase the propagation distance for communication at higher frequency bands. Beamforming enhances transmission and reception performance using a high-gain antenna. Beamforming can be classified into transmission (TX) beamforming performed in a transmitting end and reception (RX) beamforming performed in a receiving end. In general, TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of TX beamforming results in an increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming techniques, a transmitter can generate a plurality of transmit beam patterns of different directions. Each of these transmit beam patterns can be also referred as transmit (TX) beams. Wireless communication systems operating at high frequency use a plurality of narrow TX beams to transmit signals in the cell as each narrow TX beam provides coverage to a part of cell. The narrower the TX beam, the higher the antenna gain and hence the larger the propagation distance of the signal transmitted using beamforming. A receiver can also generate a plurality of receive (RX) beam patterns of different directions. Each of these receive patterns can be also referred as receive (RX) beams.

The fifth generation wireless communication system supports standalone modes of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. New Radio (NR) also supports Multi-RAT Dual Connectivity (MR-DC) operation whereby a UE in a RRC_CONNECTED state is configured to utilize radio resources provided by two distinct schedulers, located in two different nodes connected via a non-ideal backhaul and providing either E-UTRA (i.e., if the node is an ng-eNB) or NR access (i.e., if the node is a gNB). In NR for a UE in a RRC_CONNECTED state not configured with CA/DC there is only one serving cell comprising the primary cell. For a UE in a RRC_CONNECTED state configured with CA/DC the term 'serving cells' is used to denote the set of cells comprising the Special Cell(s) and all secondary cells. In NR the term Master Cell Group (MCG) refers to a group of serving cells associated with the Master Node, comprising the PCell and optionally one or more SCells. In NR the term Secondary Cell Group (SCG) refers to a group of serving cells associated with the Secondary Node, comprising the PSCell and optionally one or more SCells. In NR PCell (primary cell) refers to a serving cell in a MCG, operating on the primary frequency, in which the UE either performs the initial connection establishment procedure or initiates the connection re-establishment procedure. In NR for a UE configured with carrier aggregation (CA), an Scell is a cell providing additional radio resources on top of the Special Cell. Primary SCG Cell (PSCell) refers to a serving cell in a SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

In the fifth generation wireless communication system, a node B (gNB) or base station in cell broadcast Synchronization Signal and PBCH block (SSB) comprises primary and secondary synchronization signals (PSS, SSS) and system information. The system information includes common parameters needed to communicate in a cell. In the fifth generation wireless communication system (also referred as next generation radio or NR), System Information (SI) is divided into the Master Information Block (MIB) and a number of System Information Blocks (SIBs). The MIB is transmitted on the Broadcast Channel (BCH) with a periodicity of 80 ms and repetitions made within 80 ms and the MIB includes parameters that are used to acquire SIB1 from the cell. The SIB1 is transmitted on the Downlink-Shared Channel (DL-SCH) with a periodicity of 160 ms and variable transmission repetition. The default transmission repetition periodicity of SIB1 is 20 ms but the actual transmission repetition periodicity is up to network implementation. For SSB and CORESET multiplexing pattern 1, the SIB1 repetition transmission period is 20 ms. For SSB and CORESET multiplexing pattern 2/3, the SIB1 transmission repetition period is the same as the SSB period. SIB1 includes information regarding the availability and scheduling (e.g., mapping of SIBs to SI message, periodicity, SI-window size) of other SIBs with an indication whether one or more SIBs are only provided on-demand, and, in that case, the configuration needed by the UE to perform the SI request. SIB1 is a cell-specific SIB; SIBs other than SIB1 and posSIBs are carried in SystemInformation (SI) messages, which are transmitted on the DL-SCH. Only SIBs or posSIBs having the same periodicity can be mapped to the same SI message. SIBs and posSIBs are mapped to different SI messages. Each SI message is transmitted within periodically occurring time domain windows (referred to as SI-windows with a same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as an SI area, which comprises one or several cells and is identified by systemInformationAreaID; The mapping of SIBs to SI messages is configured in schedulingInfoList, while the mapping of posSIBs to SI messages is configured in posSchedulingInfoList. Each SIB is contained only in a single SI message and each SIB and posSIB is contained at most once in that SI message; For a UE in a RRC_CONNECTED state, the network can provide system information through dedicated signaling using the RRCReconfiguration message, e.g., if the UE has an active BWP with no common search space configured to monitor system information, paging, or upon request from the UE. In a RRC_CONNECTED state, the UE needs to acquire the required SIB(s) only from the PCell. For PSCell and SCells, the network provides the required SI by dedicated signaling, i.e., within an RRCReconfiguration message. Nevertheless, the UE acquires a MIB of the PSCell to get SFN timing of the SCG (which may be different from MCG). Upon change of relevant SI for SCell, the network releases and adds the concerned SCell. For PSCell, the required SI can only be changed with Reconfiguration with Sync.

In the fifth generation wireless communication system, the Physical Downlink Control Channel (PDCCH) is used to schedule DL transmissions on PDSCH and UL transmissions on PUSCH, where the Downlink Control Information (DCI) on PDCCH includes: downlink assignments containing at least modulation and coding format, resource allocation, and hybrid-ARQ information related to DL-SCH; and uplink scheduling grants containing at least modulation and coding format, resource allocation, and hybrid-ARQ information related to UL-SCH. In addition to scheduling, the PDCCH can be used to for: activation and deactivation of configured PUSCH transmission with configured grant; activation and deactivation of PDSCH semi-persistent transmission; notifying one or more UEs of the slot format; notifying one or more UEs of the PRB(s) and OFDM symbol(s) where the UE may assume no transmission is intended for the UE; transmission of TPC commands for PUCCH and PUSCH; transmission of one or more TPC commands for SRS transmissions by one or more UEs; switching a UE's active bandwidth part; and initiating a random access procedure. A UE monitors a set of PDCCH candidates in the configured monitoring occasions in one or more configured COntrol REsource SETs (CORESETs) according to the corresponding search space configurations. A CORESETcomprises a set of PRBs with a time duration of 1 to 3 OFDM symbols. The resource units Resource Element Groups (REGs) and Control Channel Elements (CCEs) are defined within a CORESET with each CCE comprising a set of REGs. Control channels are formed by aggregation of CCEs. Different code rates for the control channels are realized by aggregating different numbers of CCEs. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations is signaled by the GNB for each configured BWP of the serving cell wherein each search configuration is uniquely identified by a search space identifier. The search space identifier is unique amongst the BWPs of a serving cell. An identifier of a search space configuration to be used for specific purpose such as paging reception, SI reception, random access response reception is explicitly signaled by the gNB for each configured BWP. In NR search space configuration comprises the parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$\big(y^{*}(\text{number of slots in a radio frame}) + x - \text{Monitoring-offset-PDCCH-slot}\big) \bmod \big(\text{Monitoring-periodicity-PDCCH-slot}\big) = 0$$

The starting symbol of a PDCCH monitoring occasion in each slot having a PDCCH monitoring occasion is given by Monitoring-symbols-PDCCH-within-slot. The length (in symbols) of a PDCCH monitoring occasion is given in the corset associated with the search space. The search space configuration includes the identifier of a CORESET configuration associated with it. A list of CORESET configurations are signaled by the GNB for each configured bandwidth part (BWP) of the serving cell wherein each CORESET configuration is uniquely identified by a COERSET identifier. The CORESET identifier is unique amongst the BWPs of a serving cell. Note that each radio frame is of 10 ms duration. Each radio frame is identified by a radio frame number or system frame number. Each radio frame comprises several slots wherein the number of slots in a radio frame and duration of slots depends on sub carrier spacing. The number of slots in a radio frame and duration of slots for each supported SCS is pre-defined in NR. Each CORESET configuration is associated with a list of TCI (Transmission configuration indicator) states. One DL RS ID (SSB or CSI RS) is configured per TCI state. The list of TCI states corresponding to a CORESET configuration is signaled by the gNB via RRC signaling. One of the TCI states in the TCI state list is activated and indicated to the UE by the gNB. The TCI state indicates the DL TX beam (the DL TX beam is Quasi co-located [QCLed] with the SSB/CSI RS of TCI state) used by the gNB for transmission of a PDCCH in the PDCCH monitoring occasions of a search space.

In the fifth-generation wireless communication system bandwidth adaptation (BA) is supported. With BA, the receive and transmit bandwidth of a UE need not be as large as the bandwidth of the cell and can be adjusted. The width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring an RRC connected UE with BWP(s) and telling the UE which of the configured BWPs is currently the active one. When BA is configured, the UE only has to monitor PDCCH on the one active BWP. That is, it does not have to monitor PDCCH on the entire DL frequency of the serving cell. In the RRC connected state, the UE is configured with one or more DL and UL BWPs, for each configured Serving Cell (i.e., PCell or SCell). For an activated Serving Cell, there is one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random-Access procedure. Upon addition of a SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of the BWP inactivity timer the UE switches to the active DL BWP, to the default DL BWP, or initial DL BWP (if the default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UEs in a RRC CONNECTED state. Several types of random access procedures are supported.

One type of random access is referred to as contention based random access (CBRA). CBRA may also be referred to as 4 step CBRA. In this type of random access, the UE first transmits a random access preamble (also referred to as Msg1) and then waits for a random access response (RAR) in the RAR window. A RAR is also referred to as Msg2. A next generation node B (gNB) transmits the RAR on a physical downlink shared channel (PDSCH). A PDCCH scheduling the PDSCH carrying the RAR is addressed to a RA-radio network temporary identifier (RA-RNTI). The RA-RNTI identifies the time-frequency resource (also referred to as a physical RA channel (PRACH) occasion or PRACH transmission (TX) occasion or RA channel (RACH) occasion) in which the RA preamble was detected by the gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where the UE has transmitted Msg1, i.e., RA preamble; $0 \le s\_id < 14$; t_id is the index of the first slot of the PRACH occasion ($0 \le t\_id < 80$); f_id is the index of the PRACH occasion within the slot in the frequency domain ($0 \le f\_id < 8$), and ul_carrier_id is the UL carrier used for Msg1 transmission (0 for normal UL (NUL) carrier and 1 for supplementary UL (SUL) carrier. Several RARs for various random-access preambles detected by the gNB can be multiplexed in the same RAR media access control (MAC) protocol data unit (PDU) by the gNB. A RAR in the MAC PDU corresponds to the UE's RA preamble transmission if the RAR includes an RA preamble identifier (RAPID) of the RA preamble transmitted by the UE. If the RAR corresponding to its RA preamble transmission is not received during the RAR window and the UE has not yet transmitted the RA preamble for a configurable (configured by the gNB in a RACH configuration) number of times, the UE goes back to the first step, i.e., select random access resource (preamble/RACH occasion) and transmits the RA preamble. A backoff may be applied before going back to first step.

If the RAR corresponding to its RA preamble transmission is received the UE transmits message 3 (Msg3) in a UL grant received in the RAR. The Msg3 includes a message such as RRC connection request, RRC connection re-establishment request, RRC handover confirm, scheduling request, SI request etc. It may include the LIE identity (i.e., cell-radio network temporary identifier (C-RNTI) or system architecture evolution (SAE)-temporary mobile subscriber identity (S-TMSI) or a random number). After transmitting the Msg3, the LIE starts a contention resolution timer. While the contention resolution timer is running, if the LIE receives a physical downlink control channel (PDCCH) addressed to the C-RNTI included in the Msg3, contention resolution is considered successful, the contention resolution timer is stopped, and the RA procedure is completed. While the contention resolution timer is running, if the LIE receives a contention resolution MAC control element (CE) including the UE's contention resolution identity (first X bits of common control channel (CCCH) service data unit (SDU) transmitted in Msg3), the contention resolution is considered successful, the contention resolution timer is stopped, and the RA procedure is completed. If the contention resolution timer expires and LIE has not yet transmitted the RA preamble for a configurable number of times, the UE goes back to the first step i.e., select random access resource (preamble/RACH occasion) and transmits the RA preamble. A backoff may be applied before going back to the first step.

Another type of random access is referred to as contention free random access (CFRA). CFRA may also be referred to as legacy CFRA or 4 step CFRA. The CFRA procedure is used for scenarios such as handover where low latency is required, timing advance establishment for a secondary cell (Scell), etc. The evolved node B (eNB) assigns to the LIE a dedicated random access preamble. The LIE transmits the dedicated RA preamble. The eNB transmits the RAR on a PDSCH addressed to the RA-RNTI. The RAR conveys an RA preamble identifier and timing alignment information. The RAR may also include an UL grant. The RAR is transmitted in a RAR window similar to the contention-based RA (CBRA) procedure. The CFRA is considered successfully completed after receiving the RAR including a RA preamble identifier (RAPID) of the RA preamble transmitted by the LIE. In case the RA is initiated for beam failure recovery, the CFRA is considered successfully completed if a PDCCH addressed to the C-RNTI is received in a search space for beam failure recovery. If the RAR window expires and the RA is not successfully completed and the LIE has not yet transmitted the RA preamble for a configurable (configured by gNB in RACH configuration) number of times, the LIE retransmits the RA preamble.

For certain events such has handover and beam failure recovery if dedicated preamble(s) are assigned to UE, during the first step of random access i.e., during random access resource selection for Msg1 transmission the UE determines whether to transmit a dedicated preamble or non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/ROs) are provided by the gNB, the UE selects a non-dedicated preamble. Otherwise, the UE selects a dedicated preamble. So, during the RA procedure, one random access attempt can be CFRA while another random access attempt can be CBRA.

Another type of random access is referred to as 2 step contention based random access (2 step CBRA). In the first step, the UE transmits a random access preamble on a PRACH and a payload (i.e., MAC PDU) on a PUSCH. The random access preamble and payload transmission is also referred as MsgA. In the second step, after MsgA transmission, the UE monitors for a response from the network (i.e., gNB) within a configured window. The response is also referred as MsgB. A next generation node B (gNB) transmits the MsgB on a physical downlink shared channel (PDSCH). A PDCCH scheduling the PDSCH carrying MsgB is addressed to a MsgB-radio network temporary identifier (MSGB-RNTI). The MSGB-RNTI identifies the time-frequency resource (also referred to as a physical RA channel (PRACH) occasion or PRACH transmission (TX) occasion or RA channel (RACH) occasion) in which the RA preamble was detected by the gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where the UE has transmitted Msg1, i.e., RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If a CCCH SDU was transmitted in the MsgA payload, the UE performs contention resolution using the contention resolution information in MsgB. The contention resolution is successful if the contention resolution identity received in MsgB matches the first 48 bits of CCCH SDU transmitted in MsgA. If a C-RNTI was transmitted in the MsgA payload, the contention resolution is successful if the UE receives a PDCCH addressed to the C-RNTI. If contention resolution is successful, the random access procedure is considered successfully completed. Instead of contention resolution information corresponding to the transmitted MsgA, MsgB may include a fallback information corresponding to the random access preamble transmitted in MsgA. If the fallback information is received, the UE transmits Msg3 and performs contention resolution using Msg4 as in the CBRA procedure. If the contention resolution is successful, the random access procedure is considered successfully completed. If the contention resolution fails upon fallback (i.e., upon transmitting Msg3), the UE retransmits MsgA. If the configured window in which the UE monitors the network response after transmitting MsgA expires and the UE has not received MsgB including contention resolution information or fallback information as explained above, the UE retransmits MsgA. If the random access procedure is not successfully completed even after transmitting the msgA a configurable number of times, the UE falls back to the 4 step RACH procedure i.e., the UE only transmits the PRACH preamble.

The MsgA payload may include one or more of a common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include a UE ID (e.g., random ID, S-TMSI, C-RNTI, resume ID, etc.) along with a preamble in the first step. The UE ID may be included in the MAC PDU of the MsgA. A UE ID such as C-RNTI may be carried in the MAC CE wherein the MAC CE is included in a MAC PDU. Other UE IDs (such as random ID, S-TMSI, C-RNTI, resume ID, etc.) may be carried in a CCCH SDU. The UE ID can be one of a random ID, S-TMSI, C-RNTI, resume ID, IMSI, idle mode ID, inactive mode ID, etc. The UE ID can be different in different scenarios in which the UE performs the RA procedure. When the UE performs RA after power on (before it is attached to the network), then the UE ID is a random ID. When the UE perform RA in an IDLE state after it is attached to network, the UE ID is a S-TMSI. If the UE has an assigned C-RNTI (e.g., in connected state), the UE ID is the C-RNTI. In case the UE is in INACTIVE state, the UE ID is a resume ID. In addition to the UE ID, some additional control information can be sent in MsgA. The control information may be included in the MAC PDU of the MsgA. The control information may include one or more of a connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

Another type of random access is referred to as 2 step contention free random access (2 step CFRA). In 2 step CFRA, the gNB assigns to the UE a dedicated random access preamble(s) and PUSCH resource(s) for MsgA transmission. RO(s) to be used for preamble transmission may also be indicated. In the first step, the UE transmits a random access preamble on a PRACH and a payload on a PUSCH using the contention free random access resources (i.e., dedicated preamble/PUSCH resource/RO). In the second step, after MsgA transmission, the UE monitors for a response from the network (i.e., gNB) within a configured window. The response is also referred as MsgB.

The next generation node B (gNB) transmits the MsgB on a physical downlink shared channel (PDSCH). A PDCCH scheduling the PDSCH carrying MsgB is addressed to a MsgB-radio network temporary identifier (MSGB-RNTI). The MSGB-RNTI identifies the time-frequency resource (also referred to as physical RA channel (PRACH) occasion or PRACH transmission (TX) occasion or RA channel (RACH) occasion) in which the RA preamble was detected by the gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where the UE has transmitted Msg1, i.e., RA preamble; $0 \le s\_id < 14$; t_id is the index of the first slot of the PRACH occasion ($0 \le t\_id < 80$); f_id is the index of the PRACH occasion within the slot in the frequency domain ($0 \le f\_id < 8$), and ul_carrier_id is the UL carrier used for Msg1 transmission (0 for normal UL (NUL) carrier and 1 for supplementary UL (SUL) carrier.

If the UE receives a PDCCH addressed to the C-RNTI, the random access procedure is considered successfully completed. If the UE receives fallback information corresponding to its transmitted preamble, the random access procedure is considered successfully completed.

For certain events such has handover and beam failure recovery if dedicated preamble(s) and PUSCH resource(s) are assigned to the UE, during the first step of random access i.e., during random access resource selection for MsgA transmission the UE determines whether to transmit dedicated preamble or non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/ROs/PUSCH resources) are provided by the gNB, the UE selects a non-dedicated preamble. Otherwise, the UE selects a dedicated preamble. During the RA procedure, one random access attempt can be 2 step CFRA while another random access attempt can be 2 step CBRA.

Upon initiation of a random access procedure, the UE first selects the carrier (SUL or NUL). If the carrier to use for the random-access procedure is explicitly signaled by the gNB, the UE selects the signaled carrier for performing the random-access procedure. If the carrier to use for the random-access procedure is not explicitly signaled by the gNB; and if the Serving Cell for the random-access procedure is configured with supplementary uplink and if the RSRP of the downlink pathloss reference is less than rsrp-ThresholdSSB-SUL: the UE selects the SUL carrier for performing the random-access procedure. Otherwise, the UE selects the NUL carrier for performing the random-access procedure. Upon selecting the UL carrier, The UE determines the UL and DL BWP for the random access procedure. The UE then determines whether to perform 2 step or 4 step RACH for this random access procedure.

- If this random access procedure is initiated by a PDCCH order and if the ra-PreambleIndex explicitly provided by the PDCCH is not 0b000000, the UE selects 4 step RACH.
- Otherwise, if 2 step contention free random access resources are signaled by the gNB for this random access procedure, the UE selects 2 step RACH.
- Otherwise, if 4 step contention free random access resources are signaled by the gNB for this random access procedure, the UE selects 4 step RACH.
- Otherwise, if the UL BWP selected for this random access procedure is configured with only 2 step RACH resources, the UE selects 2 step RACH.
- Otherwise, if the UL BWP selected for this random access procedure is configured with only 4 step RACH resources, the UE selects 4 step RACH.
- Otherwise, if the UL BWP selected for this random access procedure is configured with both 2 step and 4 step RACH resources,
  - if the RSRP of the downlink pathloss reference is below a configured threshold, the UE selects 4 step RACH. Otherwise, the UE selects 2 step RACH.

In the fifth-generation wireless communication system, there are two types of mobility: cell level mobility and beam level mobility. Cell Level Mobility requires explicit RRC signaling to be triggered, i.e., handover. For inter-gNB handover, the signaling procedures comprise at least the following elemental components as shown in FIG. 4.

Figure 4:
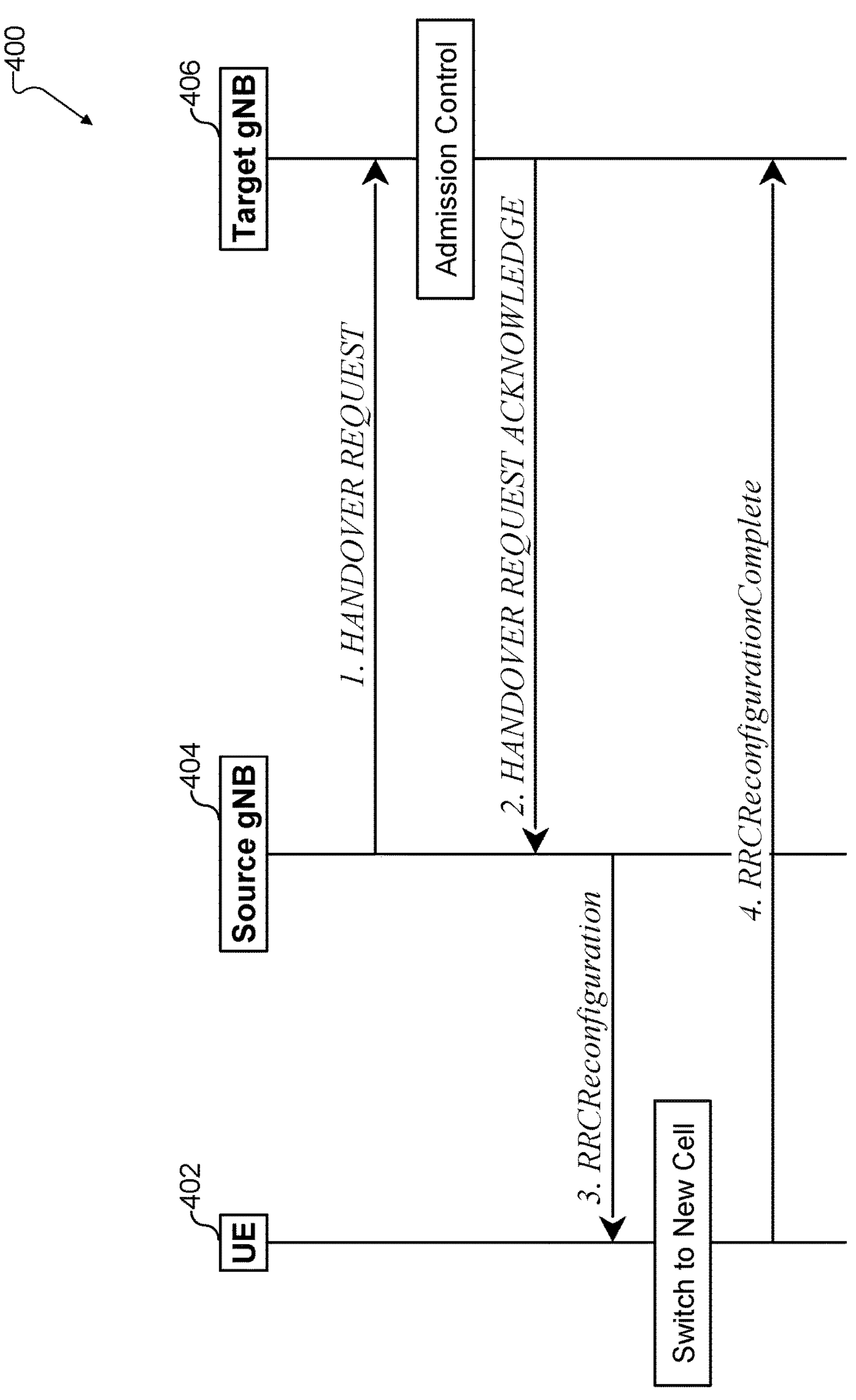
FIG. 4 illustrates a method for inter-gNB handover signaling according to embodiments of the present disclosure.

FIG. 4 illustrates a method 400 for inter-gNB handover signaling according to embodiments of the present disclosure. An embodiment of the method illustrated in FIG. 4 is for illustration only. One or more of the components illustrated in FIG. 4 may be implemented in specialized circuitry configured to perform the noted functions or one or more of the components may be implemented by one or more processors executing instructions to perform the noted functions. Other embodiments for inter-gNB handover signaling could be used without departing from the scope of this disclosure.

In the example of FIG. 4, at step 1 a source gNB 404 initiates handover and issues a HANDOVER REQUEST over the Xn interface. A target gNB 406 performs admission control and provides the new RRC configuration as part of the HANDOVER REQUEST ACKNOWLEDGE at step 2. At step 3, the source gNB 404 provides the RRC configuration to a UE 402 by forwarding the RRCReconfiguration message received in the HANDOVER REQUEST ACKNOWLEDGE. The RRCReconfiguration message includes at least cell ID and all information required to access the target cell so that UE 402 can access the target cell without reading system information. For some cases, the information required for contention-based and contention-free random access can be included in the RRCReconfiguration message. The access information to the target cell may include beam specific information, if any. The UE 402 moves the RRC connection to the target gNB 406 and replies with the RRCReconfigurationComplete at step 4. Several types of handover, normal handover, conditional handover and DAPS handover are supported.

Although FIG. 4 illustrates one example of a method 400 for inter-gNB handover signaling, various changes may be made to FIG. 4. For example, while shown as a series of steps, various steps in FIG. 4 could overlap, occur in parallel, occur in a different order, occur any number of times, be omitted, or replaced by other steps.

Beam Level Mobility does not require explicit RRC signaling to be triggered. The gNB provides for a serving cell via RRC signaling the UE with a measurement configuration containing configurations of SSB/CSI resources and resource sets, reports and trigger states for triggering channel and interference measurements and reports. Beam Level Mobility is then dealt with at lower layers by means of physical layer and MAC layer control signaling, and RRC is not required to know which beam is being used at a given point in time. Based on physical layer and MAC layer control signaling the UE can be switched from one beam to another in serving cell.

A new type of lower layer mobility also referred as L1/L2-triggered mobility (LTM) is being investigated. The Lower Layer Mobility is based on L1 measurements that are provided by the UE to the serving cell. Based on these measurements the serving cell change is triggered by sending a L1 (e.g., DCI) or L2 (e.g., MAC CE) command. In Lower Layer Mobility, the serving cell change is triggered based on L1 beam measurements instead of L3 cell power and quality measurements that are configured in NR baseline handover of Rel. 15. L3 cell quality measurements are reported only after some Time-to-Trigger (TTT) expires for a measurement event. L3 measurements are also filtered based on the L3 configuration over multiple measurements before reporting. L1 measurements have the benefit that the network can react faster to radio link degradation in the serving link as the network can save the delay introduced by L3 filtering and TTT for the handover decision. This should result in reducing in the number of radio link failures compared to baseline handover.

In the legacy handover, RRC procedure delay comprises the RRC signal processing related to decoding of the handover command and L2/3 reconfiguration of the protocol layers. For lower layer mobility, RRC procedure delay can be reduced given that the UE can receive and decode the configuration of the target cells before the cell change occurs. Moreover, since lower layer mobility is restricted to the intra-CU scenario with same PDCP and RRC, L2/3 reconfigurations can be minimized by keeping the same configuration for PDCP and RRC and possibly other layers such as RLC and MAC in the intra-DU scenario, i.e., in the inter-DU scenario the new target cell may have differ configurations for RLC and MAC. In the best case for intra-DU, the target cell can reconfigure only the new C-RNTI which can save the entire L2/3 reconfiguration for the UE.

In legacy handover there is delay due to RF/baseband retuning, derivation of target gNB security keys and configuration of the security algorithm to be used in the target cell. These can also be avoided in lower layer mobility. Given that the PDCP entity in the CU is the same for both source and target cells, the same security keys and algorithms can be applied which reduces the interruption time.

For LTM, upon receiving the L1 (e.g., DCI) or L2 (e.g., MAC CE) cell change or cell switch command for SpCell, UE initiates LTM execution procedure as follows:

- The UE starts the LTM supervisor timer and initiates transmission of an RRCReconfigurationComplete message to the target SpCell indicated in a cell change or cell switch command.
  - If the UE does not have valid TA for the target SpCell indicated in the L1 (e.g., DCI) or L2 (e.g., MAC CE) cell change or cell switch command, the UE initiates random access towards the target SpCell. During the random-access procedure, the UE transmits the RRCReconfigurationComplete message to the target SpCell in a Msg3 or MsgA. The UE stops the LTM supervisor timer upon successful completion of the LTM cell switch i.e., the LTM supervisor timer is stopped when the random-access procedure is successfully completed.
- If the UE has valid TA for the target SpCell indicated in the L1 (e.g., DCI) or L2 (e.g., MAC CE) cell change or cell switch command, the UE does not initiate random access towards the target SpCell. The UE transmits the RRCReconfigurationComplete message to target the SpCell in an UL grant (pre-configured UL grant or dynamic UL grant received from target SpCell) Msg3 or MsgA. The LTM supervisor timer is stopped when the random-access procedure is successfully completed. The UE stops the LTM supervisor timer upon successful completion of LTM cell switch i.e., when the UE determines the NW has successfully received its first UL data.
- If the LTM supervisor timer expires, RRC re-establishment is triggered. T311 is started. While T311 is running, the UE performs cell selection and selects a cell. Upon cell selection T311 is stopped, the UE starts T301 and initiates transmission of the RRCReestablishmentRequest message towards the selected cell. The re-establishment procedure leads to data interruption due to longer latency in switching to a new cell and also data loss if the new cell is not able to fetch the UE's information from the source cell. Note that a similar issue can occur when RRC re-establishment is triggered upon RLF.

Current LTM configuration only includes one reference configuration. As a result, it is not possible to optimize signaling when candidate cells belong to different CUs.

The validity of a configured uplink grant for cell switching is determined based on SSB index included in cell switch command. This is not feasible for LTM cell switch during connection re-establishment towards selected cell as there is no TCI state/SSB index available for the selected cell.

RACH vs RACH less LTM cell switch is determined based on presence/absence of TA in cell switch command. This is not feasible for LTM cell switch during connection re-establishment towards selected cell as there is no TA command received for cell selected for the selected cell.

The present disclosure provides solutions that overcome the issues identified above.

Figure 5:
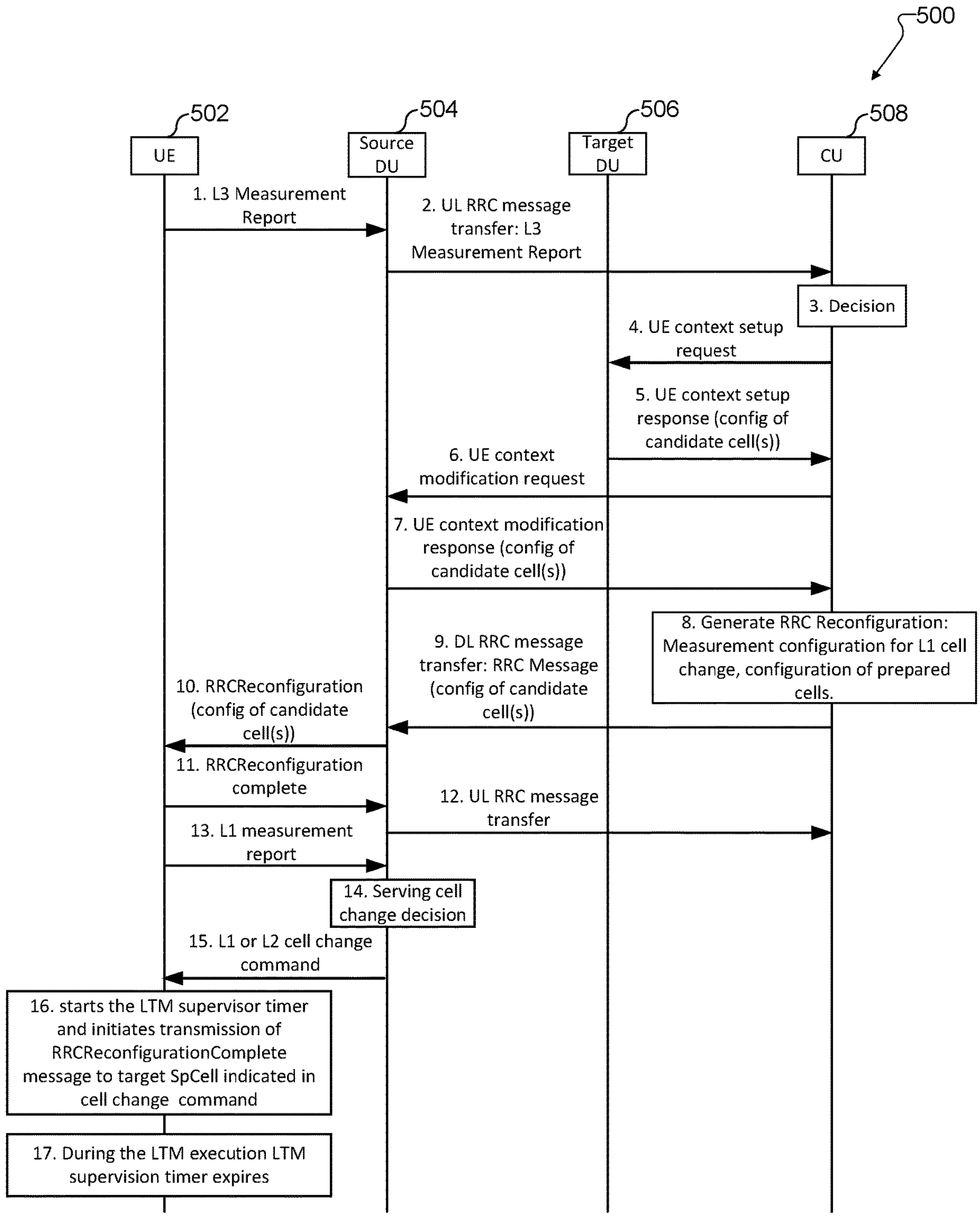
FIG. 5 illustrates a procedure for lower layer based mobility according to embodiments of the present disclosure.

FIG. 5 illustrates a procedure 500 for lower layer based mobility according to embodiments of the present disclosure. An embodiment of the procedure illustrated in FIG. 5 is for illustration only. One or more of the components illustrated in FIG. 5 may be implemented in specialized circuitry configured to perform the noted functions or one or more of the components may be implemented by one or more processors executing instructions to perform the noted functions. Other embodiments for lower layer based mobility could be used without departing from the scope of this disclosure.

In the example of FIG. 5, a UE 502 sends a measurement report containing the measurements of serving and target cell(s) in step 1 and step 2. The measurement report is sent to the serving cell. Serving DU 504 of the serving cell then forwards the report to CU 508. The measurement report can be based on L3 measurements or L1 measurements. Based on the reported measurements, CU 508 may identify a potential set of candidate target cells to which the UE can be handed over to in step 3. In this example, CU 508 identifies candidate target cells that are served by either source DU 504 or another DU (i.e., target DU 506) which are controlled by the same CU. If CU 508 identifies candidate target cells that are served by DUs of a different CU, CU 508 may request the other CU to prepare candidate target cell(s) served by the DU(s) of that CU and provide the configuration to CU 508.

CU 508 requests the preparation of a candidate target cell controlled by target DU 506 by sending a UE Context Setup Request message in step 4. Target DU 506 provides the configuration of UE 502 in a UE Context Setup Response messages, respectively, containing a container from DU 506 to CU 508 in step 5. The configuration may contain UE-specific and non-UE-specific parts. Note that step 4 and step 5 are not performed if candidate target cells of other DUs are not identified in step 3.

CU 508 requests the preparation of a candidate target cell controlled by source DU 504 by sending a UE Context Modification Request message in step 6. Source DU 504 provides the configuration of UE 502 in a UE Context Modification Response message containing a container from DU 504 to CU 508 in step 7. The configuration may contain UE-specific and non-UE-specific parts. Note that step 6 and step 7 are not performed if candidate target cells of source DU 504 are not identified in step 3.

Upon receiving the UE configurations for the candidate target cell(s), the CU generates an RRC Reconfiguration message (in step 8) including the configuration of candidate target cell(s) for L1 or L2 triggered mobility (LTM) that is sent to UE 502 in steps 9 and 10. The RRC Reconfiguration may include separate RRC Reconfiguration IEs for each of the candidate target cell(s) or CellGroupConfig IEs for each of candidate target cell(s). CU 508 sends the configuration to source DU 504 which then sends it to UE 502. Among other information, the RRC Reconfiguration message contains a measurement reporting configuration for L1/L2 mobility, i.e., a configuration on how to report the L1 beam measurements of serving and target cells; configuration of the prepared candidate cell(s) which the UE needs to execute when it receives a L1/L2 command to change the serving cell, such as random access configuration as described earlier, radio bearer configurations, indication of whether to perform PDCP re-establishment or not (per DRB or common for all), indication of whether to perform PDCP level data recovery or not (per DRB or common for all), indication of whether to perform RLC re-establishment or not (per DRB or RLC channel or common for all), indication of whether to perform MAC reset or partial MAC reset or not, etc. RRC Reconfiguration may also include firstActiveUplinkBWP and firstActiveDownlinkBWP for each prepared candidate cell(s) and a list of DL and UL BWP configurations for each prepared candidate cell(s). RRC Reconfiguration may also include InitialUplinkBWP and InitialDownlinkBWP for each prepared candidate cell(s) and a list of DL and UL BWP configurations for each prepared candidate cell(s). In addition to including separate RRCReconfiguration IEs for each of the candidate cells for LTM, the RRCReconfiguration message also includes a RACH configuration for early TA maintenance for one or more candidate cells for LTM. A list of RACH configurations may be included in the RRCReconfiguration message for early TA maintenance wherein each RACH configuration in the list corresponds to a candidate cell (candidate cell id or PCI is used to identify the corresponding candidate cell). BWP configuration associated with each RACH configuration for early TA maintenance is also included in the RRCReconfiguration message. For each candidate cell for LTM, the RRCReconfiguration message includes a RRCReconfiguration IE (comprising candidate cell configuration to be used upon switching), RACH configuration for early TA maintenance (comprising RA configuration/parameters to be applied when RA for early TA is initiated) and UL (and/or DL) BWP configuration for early TA maintenance (comprising BWP information to be applied when RA for early TA is initiated). Note that the candidate cell configuration for early TA (RACH configuration, BWP configuration etc.) is separate from the candidate cell configuration included in RRCReconfiguration IE. The candidate cell configuration included in the RRCReconfiguration IE is applied after the cell switch command is received. The candidate cell configuration for early TA is applied before the cell switch command. For each candidate cell (identified by a candidate cell index or physical cell ID or PCI) for LTM, in addition to the RRCReconfiguration IE, for early TA for the candidate cell, the RRCReconfiguration message includes following for NUL and/or SUL of the candidate cell: BWP configuration (BWP-UplinkCommon IE which includes subcarrierSpacing; locationAndBandwidth i.e., Frequency domain location and bandwidth of this bandwidth part, the first PRB of BWP is a PRB determined by subcarrierSpacing of this BWP and offsetToCarrier; and RACH configuration), absoluteFrequencyPointA i.e., Absolute frequency of the reference resource block (Common RB 0) for the UL carrier, its lowest subcarrier is also known as Point A, offsetToCarrier i.e., Offset in frequency domain between Point A (lowest subcarrier of common RB 0) and the lowest usable subcarrier on this carrier in number of PRBs (using the subcarrierSpacing defined for this carrier). A list of [candidate cell id, BWP configuration and carrier configuration] for early TA may be included in the RRCReconfiguration message. In one embodiment, instead of BWP configuration for early TA, BWP ID may be included which refers to BWP amongst the BWP configurations of the candidate cell in the RRCReconfiguration IE of that candidate cell.

In one embodiment, if all candidate cells belong to the same CU, the CU includes one RRCReconfiguration IE for reference configuration and one RRCReconfiguration IE for each candidate cell configuration. The UE will combine the reference configuration and candidate cell configuration to determine the complete configuration of the candidate cell.

In one embodiment, if candidate cells belong to two different CUs i.e. some candidate cell(s) belong to one CU and other candidate cell(s) belong to another CU), the source CU includes two sets.

The first set includes a RRCReconfiguration IE for the reference configuration and one or more RRCReconfiguration IEs for the candidate cell configuration where each RRCReconfiguration IE is for a different candidate cell. For example, if there are three candidate cells belonging to a CU (say CU1), the first set includes a RRCReconfiguration IE for the reference configuration and three more RRCReconfiguration IEs, one for each candidate cell.

The second set includes a RRCReconfiguration IE for the reference configuration and one or more RRCReconfiguration IEs for the candidate cell configuration where each RRCReconfiguration IE is for a different candidate cell. For example, if there are two candidate cells belonging to a CU (say CU 2), the second set includes a RRCReconfiguration IE for the reference configuration and two more RRCReconfiguration IEs, one for each candidate cell.

If CU1 is the source CU, CU1 will receive RRCReconfiguration IEs for the second set from CU 2.

For determining the full configuration of the candidate cell, the UE will use the reference configuration from the set in which the candidate cell's configuration is included. The UE will combine the reference configuration and candidate cell configuration to determine the complete configuration of the candidate cell.

In one embodiment, multiple sets of configurations where each set includes a reference configuration, and one or more candidate cell configurations is signaled in step 10. Each set may correspond to cells of different CUs.

In one embodiment, each candidate cell configuration for L1 or L2 triggered mobility (LTM) is assigned a unique configuration identity by the source CU 508 irrespective of whether the candidate cell belongs to source CU 508 or another CU. This configuration identity is included in the RRCReconfiguration sent to the UE. In another embodiment, the candidate cell configuration for L1 or L2 triggered mobility (LTM) is assigned a configuration identity by the CU of that candidate cell. This configuration identity is included in the RRCReconfiguration sent to the UE. In order to ensure that the configuration identity is unique across the candidate cells of different CUs, source CU 508 can provide a starting configuration identity to other the CU when requesting it to prepare candidate cells. The other CU can assign a unique configuration identity to each of its candidate cells starting from a starting configuration identity received from source CU 508. The assigned configuration identity is sent by the other CU to source CU 508 together with the candidate cell configuration. Source CU 508 then sends the candidate cell configuration with the configuration identity to the UE.

UE 502 confirms the RRC Reconfiguration to the network in steps 11 and 12.

After confirming the RRC Reconfiguration to the network, UE 502 starts to report the L1 beam measurement of serving and candidate target cells as in step 13. Based on measurements the serving cell may decide to trigger cell change command in step 14. In an example, upon determining that there is a target candidate cell having a better radio link/beam measurement than the serving cell (step 14), e.g., L1-RSRP of target beam measurement >L1-RSRP of serving beam measurement+Offset for a time period (i.e., Time-to-Trigger (TTT) period), the serving cell sends a L1 or L2 cell change/switch command in step 15 to trigger the cell change to the target candidate cell. It is to be noted that RRCReconfiguration may also be sent based on the measurements received in step 13 and later when a condition for cell change is met, the serving cell sends a L1 or L2 cell change/switch command.

Between step 12 and step 14, the serving cell may send a PDCCH order to the UE to perform RA towards a candidate cell (for early TA). In an embodiment the UE initiates RA using RACH configuration configured for early TA of the candidate cell and uses the UL BWP configured for early TA for Msg1/MsgA preamble transmission. This can be repeated for one or more candidate cells received in step 10.

Based on the random access preamble received from the UE, the candidate cell determines the TA value. The candidate cell provides the TA to UE in response (e.g., in RAR or in MAC CE). If the UE receives the TA value, it shall start timing alignment timer for the TAG of the candidate cell and stores the received TA. The stored value of TA is removed if the timing alignment timer expires.

Alternately the candidate cell can provide the TA value to the source cell which then sends it to the UE later in a L1 or L2 cell change/switch command (MAC CE or DCI). Alternately, the candidate cell stores the TA value and when source cell decides to switch the UE to this candidate cell it asks the candidate cell for the TA value and the TA value received by the source cell from the candidate cell is sent by the source cell to the UE in the L1 or L2 cell change/switch command (MAC CE or DCI). Alternately, the candidate cell stores the TA value and when the source cell asks the candidate cell for the TA value it sends the same to the source cell and the TA value received by the source cell from the candidate cell is sent by the source cell to the UE in the L1 or L2 cell change/switch command (MAC CE or DCI).

The gNB may configure in LTM configuration whether a RAR is provided in response to the RACH preamble (or in other words whether the UE should monitor for a RAR after transmitting a RA preamble or not). This configuration can be per LTM candidate cell or common for all LTM candidate cells.

In one embodiment, upon receiving the PDCCH order for early TA for a candidate cell, for preamble transmission to the candidate cell, the UE performs the following operation:

- If the RAR is not configured for early TA:
  - If the PDCCH order (or a field in PDCCH order) indicates initial transmission
    - The UE or MAC entity in UE sets PREAMBLE_POWER_RAMPING_COUNTER is set to 1
  - If the PDCCH order (or a field in PDCCH order) indicates retransmission
    - The UE or MAC entity in UE sets PREAMBLE_POWER_RAMPING_COUNTER to 2 (or a predefined value or value signaled in LTM configuration)
- If the RAR is configured for early TA
  - PREAMBLE_POWER_RAMPING_COUNTER is set to 1 when the RA procedure is initiated. For each PRACH preamble transmission during the RA procedure:
    - if PREAMBLE_TRANSMISSION_COUNTER is greater than one; and if the notification of suspending power ramping counter has not been received from lower layers; and if LBT failure indication was not received from lower layers for the last Random Access Preamble transmission; and 1> if the SSB or CSI-RS selected is not changed from the selection in the last Random Access Preamble transmission: increment PREAMBLE_POWER_RAMPING_COUNTER by 1
    - The UE or MAC entity in the UE selects the value of DELTA_PREAMBLE
    - The UE or MAC entity in the UE sets PREAMBLE_POWER_RAMPING_STEP to powerRampingStep or sets PREAMBLE_POWER_RAMPING_STEP to the powerRampingStepHighPriority. powerRampingStep or powerRampingStepHighPriority is signaled by the gNB in the random access configuration/RACH configuration configured for early TA of the candidate cell
    - The UE or MAC entity in the UE sets PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA where preambleReceivedTargetPower is initial Random Access Preamble power for 4-step RA type and is signaled by gNB in random access configuration/RACH configuration configured for early TA of the candidate cell
- The UE then determines the prach preamble transmission power based on PREAMBLE_RECEIVED_TARGET_POWER and pathloss. UE then transmit PRACH preamble to the candidate cell using the determined transmission power.

In one embodiment, upon receiving the PDCCH order for early TA for a candidate cell, for preamble transmission to the candidate cell, UE perform the following operation:

If the RAR is not configured for early TA:

If the PDCCH order (or a field in PDCCH order) indicates initial transmission

The UE or MAC entity in the UE selects the value of DELTA_PREAMBLE

The UE or MAC entity in the UE sets PREAMBLE_RECEIVED_TARGET_POWER to preambleReceivedTargetPower+DELTA_PREAMBLE where preambleReceivedTargetPower is initial Random Access Preamble power for 4-step RA type and is signaled by the gNB in the random access configuration/RACH configuration configured for early TA of the candidate cell If the PDCCH order (or a field in PDCCH order) indicates retransmission The UE or MAC entity in the UE sets PREAMBLE_RECEIVED_TARGET_POWER to preambleReceivedTargetPower+DELTA_PREAMBLE+PowerRampingupValue where preambleReceivedTargetPower is an initial Random Access Preamble power for 4-step RA type and is signaled by the gNB in the random access configuration/RACH configuration configured for early TA of the candidate cell. PowerRampingupValue is signaled by the gNB in the random access configuration/RACH configuration configured for early TA of the candidate cell or in PDCCH order If the RAR is configured for early TA PREAMBLE_POWER_RAMPING_COUNTER is set to 1 when the RA procedure is initiated. For each PRACH preamble transmission during RA procedure:

if PREAMBLE_TRANSMISSION_COUNTER is greater than one; and if the notification of suspending the power ramping counter has not been received from lower layers; and if LBT failure indication was not received from lower layers for the last Random Access Preamble transmission; and 1> if SSB or CSI-RS selected is not changed from the selection in the last Random Access Preamble transmission: increment PREAMBLE_POWER_RAMPING_COUNTER by 1 the UE or MAC entity in the UE selects the value of DELTA_PREAMBLE

The UE or MAC entity in the UE sets PREAMBLE_POWER_RAMPING_STEP to powerRampingStep or sets PREAMBLE_POWER_RAMPING_STEP to the powerRampingStepHighPriority. powerRampingStep or powerRampingStepHighPriority is signaled by the gNB in the random access configuration/RACH configuration configured for early TA of the candidate cell The UE or MAC entity in the UE sets PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA where preambleReceivedTargetPower is the initial Random Access Preamble power for 4-step RA type and is signaled by the gNB in the random access configuration/RACH configuration configured for early TA of the candidate cell The UE then determines the prach preamble transmission power based on PREAMBLE_RECEIVED_TARGET_POWER and pathloss. The UE then transmits a PRACH preamble to the candidate cell using the determined transmission power.

For LTM, upon receiving the L1 (e.g., DCI) or L2 (e.g., MAC CE) cell change or cell switch command for SpCell, UE 502 initiates the LTM execution procedure:

At step 16, UE 502 starts the LTM supervisor timer and initiates transmission of a RRCReconfigurationComplete message to the target SpCell indicated in the cell change or cell switch command. The value of the LTM supervisor timer is received by UE 502 in the configuration received in step 10. The LTM supervisor timer can be common for all candidate cells or can be specific to each candidate cell whose configuration is received in step 10.

If UE 502 does not have valid TA for the target SpCell indicated in L1 (e.g., DCI) or L2 (e.g., MAC CE) cell change or cell switch command, UE 502 initiates random access towards the target SpCell. During the random-access procedure, UE 502 transmits the RRCReconfigurationComplete message to the target SpCell in a Msg3 or MsgA. UE 502 stops the LTM supervisor timer upon successful completion of LTM cell switch i.e., the LTM supervisor timer is stopped when the random-access procedure is successfully completed.

If UE 502 has valid TA for the target SpCell indicated in L1 (e.g., DCI) or L2 (e.g., MAC CE) cell change or cell switch command, UE 502 does not initiate random access towards the target SpCell. UE 502 transmits the RRCReconfigurationComplete message to the target SpCell in a UL grant (pre-configured UL grant or dynamic UL grant received from target SpCell) Msg3 or MsgA. The LTM supervisor timer is stopped when the random-access procedure is successfully completed. UE 502 stops the LTM supervisor timer upon successful completion of LTM cell switch i.e., when the UE determines the NW has successfully received its first UL data.

Although FIG. 5 illustrates one example of a procedure 500 for lower layer based mobility, various changes may be made to FIG. 5. For example, while shown as a series of steps, various steps in FIG. 5 could overlap, occur in parallel, occur in a different order, occur any number of times, be omitted, or replaced by other steps.

Figure 6:
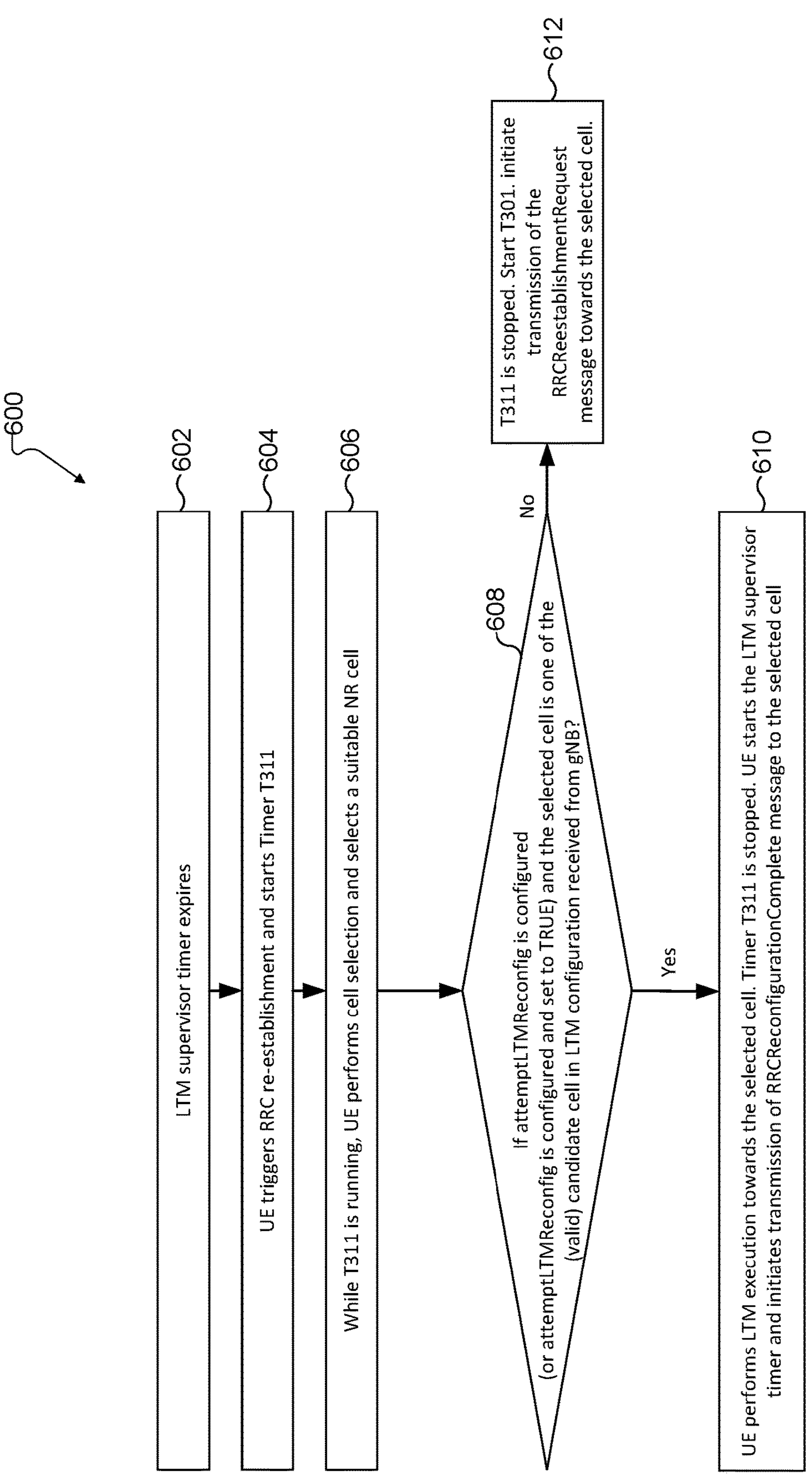
FIG. 6 illustrates a procedure for RRC reestablishment according to embodiments of the present disclosure.

In one embodiment, when the LTM supervisor timer expires, such as at step 17 of FIG. 5 (or when a RLF timer/T310 expires; or upon a random access problem indication from the MCG MAC while neither T300, T301, T304, T311 nor T319, LTM supervision timer are running and SDT procedure is not ongoing; or upon indication from the MCG RLC that the maximum number of retransmissions has been reached while SDT procedure is not ongoing; or upon consistent uplink LBT failure indication from the MCG MAC while T304 and the LTM supervision timer are not running; or upon detection of a radio link failure; or if the LTM cell switch is considered failed e.g., because a TCI state/RS [e.g., SSB/CSI RS/TRS] indicated by the UE is not suitable i.e., its RSRP/RSRQ is less/less than equal to a configured threshold), the UE performs the operation shown in FIG. 6.

FIG. 6 illustrates a procedure 600 for RRC reestablishment according to embodiments of the present disclosure.

An embodiment of the procedure illustrated in FIG. 6 is for illustration only. One or more of the components illustrated in FIG. 6 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In the example of FIG. 6, the process begins at step 602. At step 602, an LTM supervisor timer expires, similar to step 17 of FIG. 5. At step 604, a UE such as UE 502 of FIG. 5 triggers/initiates RRC connection re-establishment and starts Timer T311. At step 606, while T311 is running, the UE performs cell selection and selects a suitable NR cell.

At step 608, if attemptLTMReconfig is configured i.e. if attemptLTMReconfig field/parameter is received in the LTM configuration received from the gNB (e.g., in step 10 of FIG. 5) (or attemptLTMReconfig is configured i.e. if attemptLTMReconfig field/parameter is received in the LTM configuration received from the gNB and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5), the process proceeds to step 610. Otherwise, the process proceeds to step 612. In one embodiment, a valid candidate cell is the cell for which reconfigurationWithSync/ltm-CellSwitchInfo IE is included in the LTM configuration and cell belongs to MCG or alternately, the valid candidate cell is the cell for which reconfigurationWithSync/ltm-CellSwitchInfo IE is included in the LTM configuration.

At step 610, the UE performs LTM execution towards the selected cell. Timer T311 is stopped, and the UE starts the LTM supervisor timer and initiates transmission of RRCReconfigurationComplete message to the selected cell. In one embodiment, If the UE does not have valid TA for the selected cell, the UE initiates random access towards the selected cell. During the random-access procedure, UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

In one embodiment, if the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The pre-configured UL grant may be received by the UE in the selected cell's LTM configuration (e.g., in step 10 of FIG. 5). The UE stops the LTM supervisor timer, when the UE determines the NW (i.e., selected cell) has successfully received its first UL data.

In one embodiment, the UE stops the LTM supervisor timer if PDCCH addressed to C-RNTI scheduling UL grant for new transmission is received from the selected cell. In an embodiment, the UE stops the LTM supervisor timer if PDCCH addressed to C-RNTI scheduling new DL TB is received from the selected cell.

In one embodiment the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

In one embodiment, if the configured grant configuration for the LTM cell switch is configured and UE has valid TA (or UE has estimated TA) for the selected cell, the UE does not initiate random access towards the selected cell. The UE transmits the RRCReconfigurationComplete message to the selected cell in an UL grant (pre-configured UL grant or dynamic UL grant received from the selected cell). The pre-configured UL grant may be received by the UE in the selected cell's LTM configuration (e.g., in step 10 of FIG. 5). The UE stops the LTM supervisor timer, when the UE determines the NW (i.e., selected cell) has successfully received its first UL data. In one embodiment, the UE stops the LTM supervisor timer if PDCCH addressed to C-RNTI scheduling UL grant for new transmission is received from the selected cell. In one embodiment, the UE stops the LTM supervisor timer if PDCCH addressed to C-RNTI scheduling new DL TB is received from the selected cell. Otherwise, (e.g., if the configured grant configuration for LTM cell switch is not configured or if the UE does not have valid TA (or the UE does not have estimated TA) for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

At step 612 T311 is stopped. The UE starts T301 and initiates transmission of the RRCReestablishmentRequest message towards the selected cell.

The attemptLTMReconfig field indicates whether the UE can perform LTM executions towards one of the candidate cells in the LTM configuration received from the gNB in step 10 of FIG. 5. attemptLTMReconfig field can be signaled by the gNB in the configuration received from the gNB (e.g., in step 10 of FIG. 5). If an attemptLTMReconfig field is present in the LTM configuration, the UE shall perform LTM reconfiguration if the selected cell is a candidate cell in LTM configuration, and it is the first cell selection after the LTM failure. Alternately, if an attemptLTMReconfig field is present in the LTM configuration, the UE shall perform LTM reconfiguration if the selected cell is a candidate cell in the LTM configuration.

Although FIG. 6 illustrates one example of a procedure 600 for RRC reestablishment, various changes may be made to FIG. 6. For example, while shown as a series of steps, various steps in FIG. 6 could overlap, occur in parallel, occur in a different order, occur any number of times, be omitted, or replaced by other steps.

Figure 7:
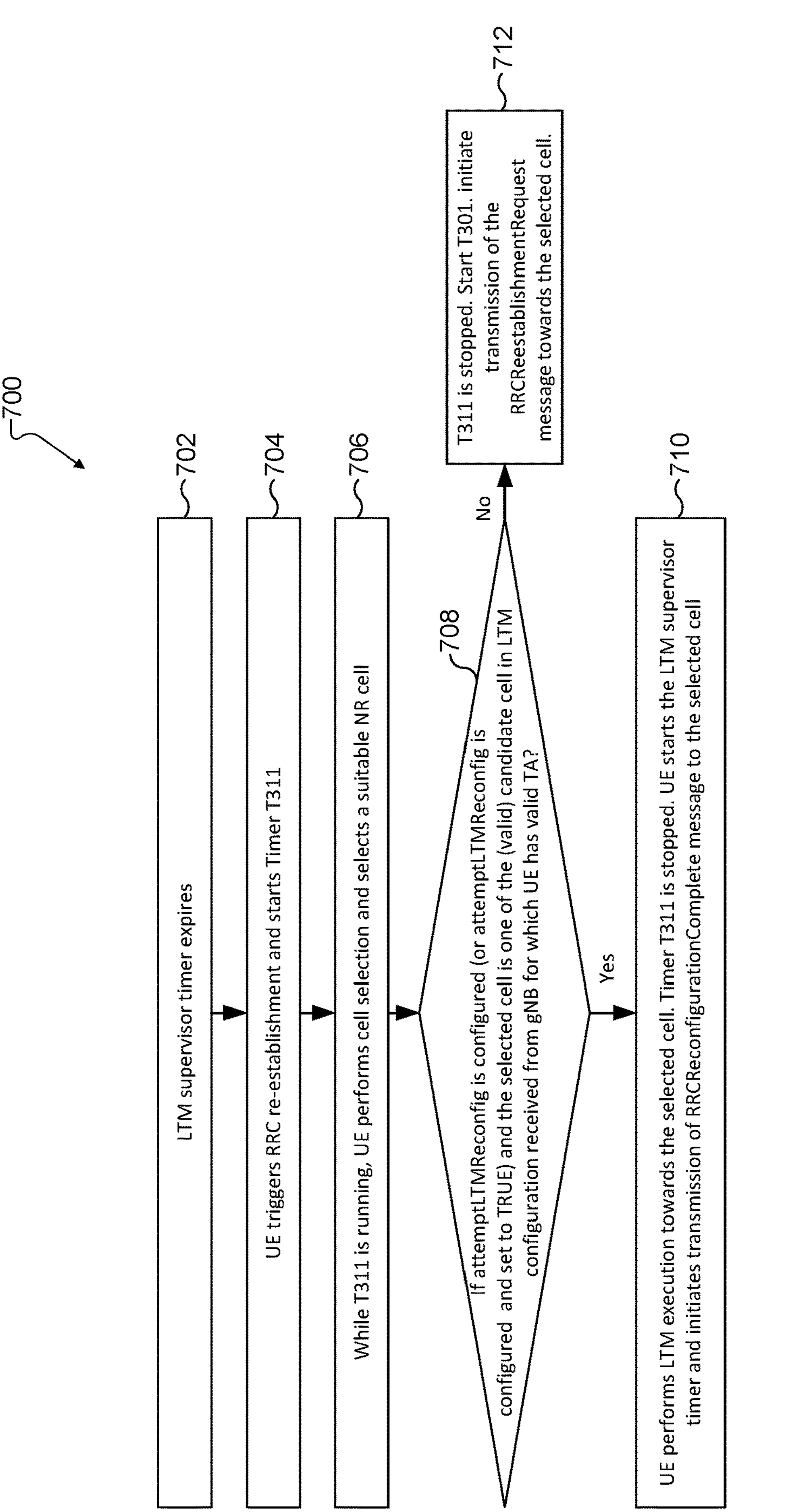
FIG. 7 illustrates another procedure for RRC reestablishment according to embodiments of the present disclosure.

In one embodiment, when an LTM supervisor timer expires such as at step 17 of FIG. 5 (or when a RLF timer/T310 expires; or upon a random access problem indication from the MCG MAC while neither T300, T301, T304, T311 nor T319, LTM supervision timer are running and SDT procedure is not ongoing; or upon indication from the MCG RLC that the maximum number of retransmissions has been reached while SDT procedure is not ongoing; or upon consistent uplink LBT failure indication from the MCG MAC while T304 and the LTM supervision timer are not running; or upon detection of a radio link failure; or if the LTM cell switch is considered failed e.g., because a TCI state/RS [e.g., SSB/CSI RS/TRS] indicated by the UE is not suitable i.e., its RSRP/RSRQ is less/less than equal to a configured threshold), the UE performs the operation shown in FIG. 7.

FIG. 7 illustrates another procedure 700 for RRC reestablishment according to embodiments of the present disclosure. An embodiment of the procedure illustrated in FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In the example of FIG. 7, the process begins at step 702. At step 702, an LTM supervisor timer expires, similar to step 17 of FIG. 5. At step 704, a UE such as UE 502 of FIG. 5 triggers/initiates RRC connection re-establishment and starts Timer T311. At step 706, while T311 is running, the UE performs cell selection and selects a suitable NR cell.

At step 708, if attemptLTMReconfig is configured i.e. if attemptLTMReconfig field/parameter is received in the LTM configuration received from the gNB (e.g., in step 10 of FIG. 5) (or attemptLTMReconfig is configured i.e. if attemptLTMReconfig field/parameter is received in the LTM configuration received from the gNB (e.g., in step 10 of FIG. 5) and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and for which the UE has valid TA, the process proceeds to step 710. Otherwise, the process proceeds to step 712. In one embodiment, a valid candidate cell is the cell for which reconfigurationWithSync/ltmCellSwitchInfo IE is included in the LTM configuration and the cell belongs to the MCG or alternately, a valid candidate cell is the cell for which the reconfigurationWithSync/ltmCellSwitchInfo IE is included in the LTM configuration.

At step 710, the UE performs LTM execution towards the selected cell. Timer T311 is stopped, and the UE starts the LTM supervisor timer and initiates transmission of a RRCReconfigurationComplete message to the selected cell. The UE transmits the RRCReconfigurationComplete message to the selected cell in a UL grant (pre-configured UL grant or dynamic UL grant received from the selected cell). The UE stops the LTM supervisor timer, when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling the new DL TB is received from the selected cell.

At step 712, T311 is stopped. The UE starts T301, and initiates transmission of the RRCReestablishmentRequest message towards the selected cell. The attemptLTMReconfig field indicates whether the UE can perform LTM executions towards one of the candidate cells in the LTM configuration received from the gNB in step 10 of FIG. 5. attemptLTMReconfig can be signaled by the gNB in configuration received from them gNB (e.g., in step 10 of FIG. 5). If the attemptLTMReconfig field is present in the LTM configuration, the UE shall perform LTM reconfiguration if the selected cell is a candidate cell in the LTM configuration, and it is the first cell selection after the LTM failure. Alternately, if the attemptLTMReconfig field is present in the LTM configuration, the UE shall perform LTM reconfiguration if the selected cell is a candidate cell in the LTM configuration.

Although FIG. 7 illustrates one example of a procedure 700 for RRC reestablishment, various changes may be made to FIG. 7. For example, while shown as a series of steps, various steps in FIG. 7 could overlap, occur in parallel, occur in a different order, occur any number of times, be omitted, or replaced by other steps.

Figure 8:
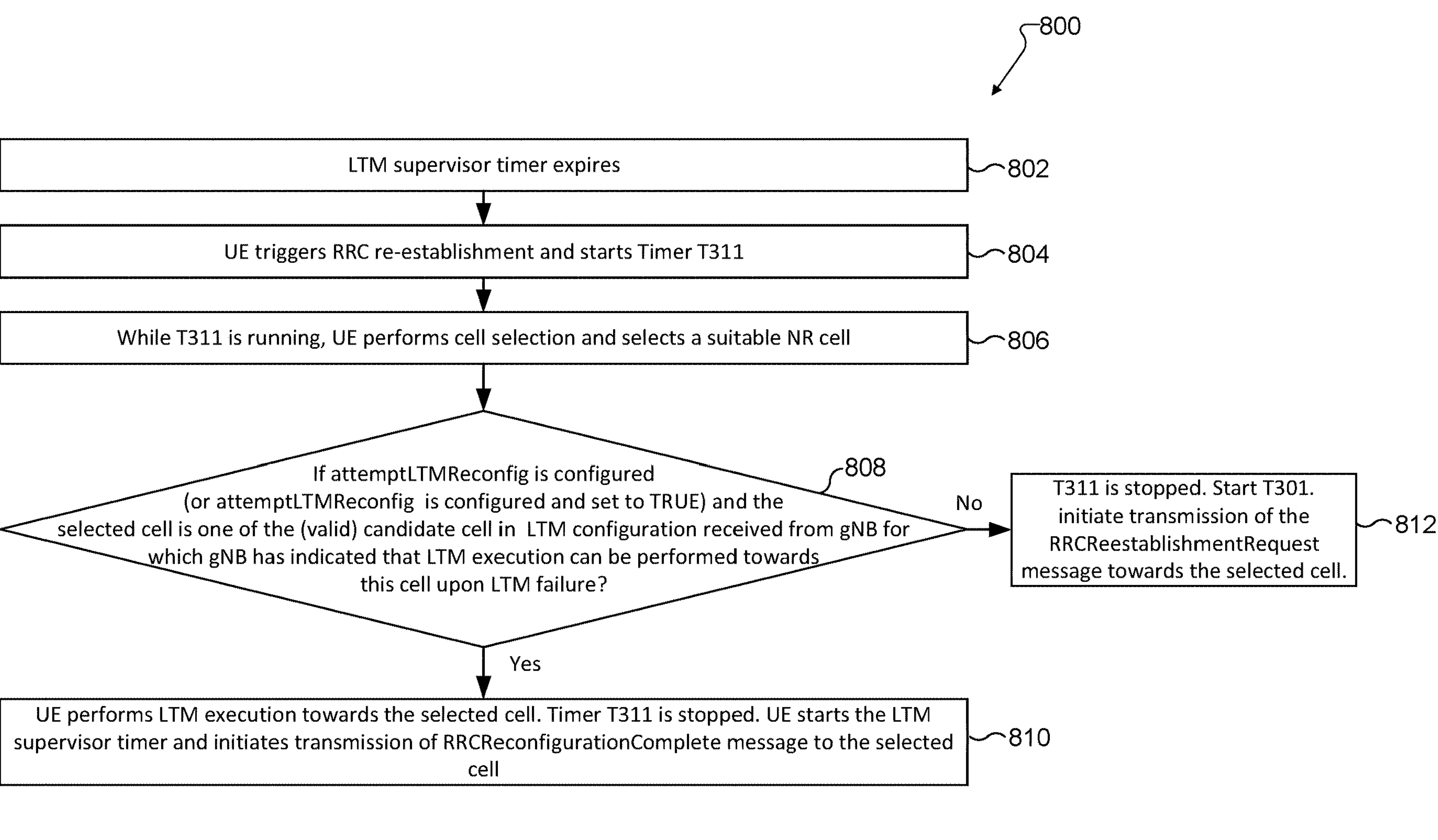
FIG. 8 illustrates another procedure for RRC reestablishment according to embodiments of the present disclosure.

In one embodiment, when an LTM supervisor timer expires such as at step 17 of FIG. 5 (or when a RLF timer/T310 expires; or upon a random access problem indication from the MCG MAC while neither T300, T301, T304, T311 nor T319, LTM supervision timer are running and SDT procedure is not ongoing; or upon indication from the MCG RLC that the maximum number of retransmissions has been reached while SDT procedure is not ongoing; or upon consistent uplink LBT failure indication from the MCG MAC while T304 and the LTM supervision timer are not running; or upon detection of a radio link failure; or if the LTM cell switch is considered failed e.g., because a TCI state/RS [e.g., SSB/CSI RS/TRS] indicated by the UE is not suitable i.e., its RSRP/RSRQ is less/less than equal to a configured threshold), the UE performs the operation shown in FIG. 8.

FIG. 8 illustrates another procedure 800 for RRC reestablishment according to embodiments of the present disclosure. An embodiment of the procedure illustrated in FIG. 8 is for illustration only. One or more of the components illustrated in FIG. 8 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In the example of FIG. 8, the process begins at step 802. At step 802, an LTM supervisor timer expires, similar to step 17 of FIG. 5. At step 804, a UE such as UE 502 of FIG. 5 triggers/initiates RRC connection re-establishment and starts Timer T311. At step 806, while T311 is running, the UE performs cell selection and selects a suitable NR cell.

At step 808, if attemptLTMReconfig is configured i.e. if attemptLTMReconfig field/parameter is received in the LTM configuration received from the gNB (e.g., in step 10 of FIG. 5) (or attemptLTMReconfig is configured i.e. if attemptLTMReconfig field/parameter is received in the LTM configuration received from the gNB (e.g., in step 10 of FIG. 5) and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and for which the gNB has indicated that LTM execution can be performed towards this cell upon LTM failure, the process proceeds to step 810. Otherwise, the process proceeds to step 812. In one embodiment, a valid candidate cell is the cell for which reconfigurationWithSync/ltmCellSwitchInfo IE is included in the LTM configuration and the cell belongs to the MCG or alternately, a valid candidate cell is the cell for which reconfigurationWithSync/ltmCellSwitchInfo IE is included in the LTM configuration.

At step 810, the UE performs LTM execution towards the selected cell. Timer T311 is stopped, and the UE starts the LTM supervisor timer and initiates transmission of an RRCReconfigurationComplete message to the selected cell.

In one embodiment, if the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

In one embodiment, if the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The UE stops the LTM supervisor timer when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling a new DL TB is received from the selected cell.

In one embodiment the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

At step 812, T311 is stopped. The UE starts T301, and initiates transmission of the RRCReestablishmentRequest message towards the selected cell.

Although FIG. 8 illustrates one example of a procedure 800 for RRC reestablishment, various changes may be made to FIG. 8. For example, while shown as a series of steps, various steps in FIG. 8 could overlap, occur in parallel, occur in a different order, occur any number of times, be omitted, or replaced by other steps.

Figure 9:
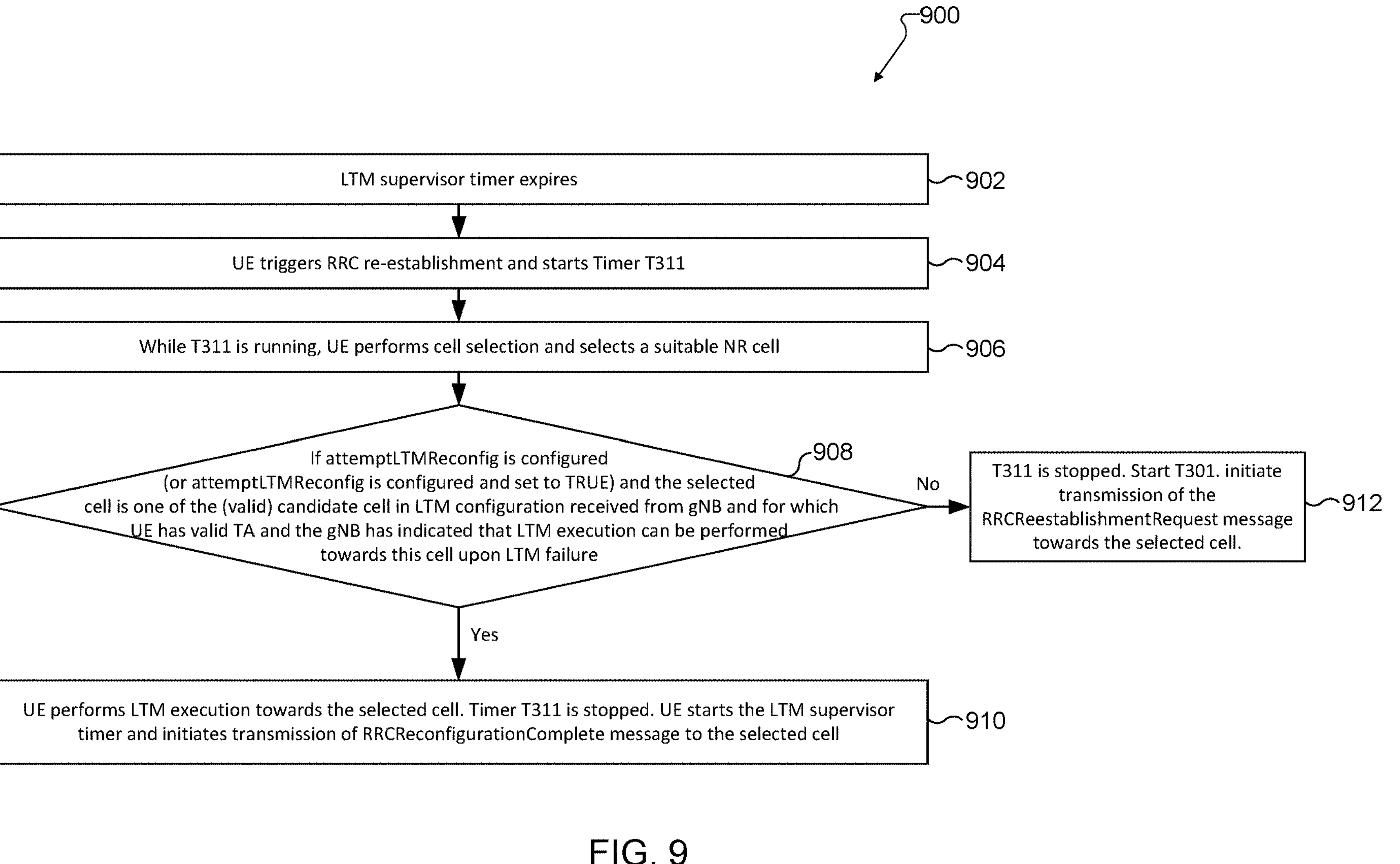
FIG. 9 illustrates another procedure for RRC reestablishment according to embodiments of the present disclosure.

In one embodiment, when an LTM supervisor timer expires such as at step 17 of FIG. 5 (or when a RLF timer/T310 expires; or upon a random access problem indication from the MCG MAC while neither T300, T301, T304, T311 nor T319, LTM supervision timer are running and SDT procedure is not ongoing; or upon indication from the MCG RLC that the maximum number of retransmissions has been reached while SDT procedure is not ongoing; or upon consistent uplink LBT failure indication from the MCG MAC while T304 and the LTM supervision timer are not running; or upon detection of a radio link failure; or if the LTM cell switch is considered failed e.g., because a TCI state/RS [e.g., SSB/CSI RS/TRS] indicated by the UE is not suitable i.e., its RSRP/RSRQ is less/less than equal to a configured threshold), the UE performs the operation shown in FIG. 9.

FIG. 9 illustrates another procedure 900 for RRC reestablishment according to embodiments of the present disclosure. An embodiment of the procedure illustrated in FIG. 9 is for illustration only. One or more of the components illustrated in FIG. 9 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In the example of FIG. 9, the process begins at step 902. At step 902, an LTM supervisor timer expires, similar to step 17 of FIG. 5. At step 904, a UE such as UE 502 of FIG. 5 triggers/initiates RRC connection re-establishment and starts Timer T311. At step 906, while T311 is running, the UE performs cell selection and selects a suitable NR cell.

At step 908, if attemptLTMReconfig is configured (or attemptLTMReconfig is configured and set to TRUE) and the selected cell is one of the (valid) candidate cell (the candidate cell in the LTM configuration for which LTM execution has failed is not considered valid) in the LTM configuration received from the gNB (e.g., in step 10 of FIG. 5) for which the UE has valid TA and the gNB has indicated that LTM execution can be performed towards this cell upon LTM failure, the process proceeds to step 910. Otherwise, the process proceeds to step 912. In one embodiment, a valid candidate cell is the cell for which a reconfigurationWithSync/ltmCellSwitchInfo IE is included in the LTM configuration and the cell belongs to the MCG or alternately, a valid candidate cell is the cell for which a reconfigurationWithSync/ltmCellSwitchInfo IE is included in the LTM configuration.

At step 912, the UE performs LTM execution towards the selected cell. Timer T311 is stopped, and the UE starts the LTM supervisor timer and initiates transmission of a RRCReconfigurationComplete message to the selected cell. The UE transmits the RRCReconfigurationComplete message to the selected cell in an UL grant (pre-configured UL grant or dynamic UL grant received from the selected cell). The UE stops the LTM supervisor timer, when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell.

At step 912, T311 is stopped. The UE starts T301, and initiates transmission of the RRCReestablishmentRequest message towards the selected cell.

Although FIG. 9 illustrates one example of a procedure 900 for RRC reestablishment, various changes may be made to FIG. 9. For example, while shown as a series of steps, various steps in FIG. 9 could overlap, occur in parallel, occur in a different order, occur any number of times, be omitted, or replaced by other steps.

Figure 10:
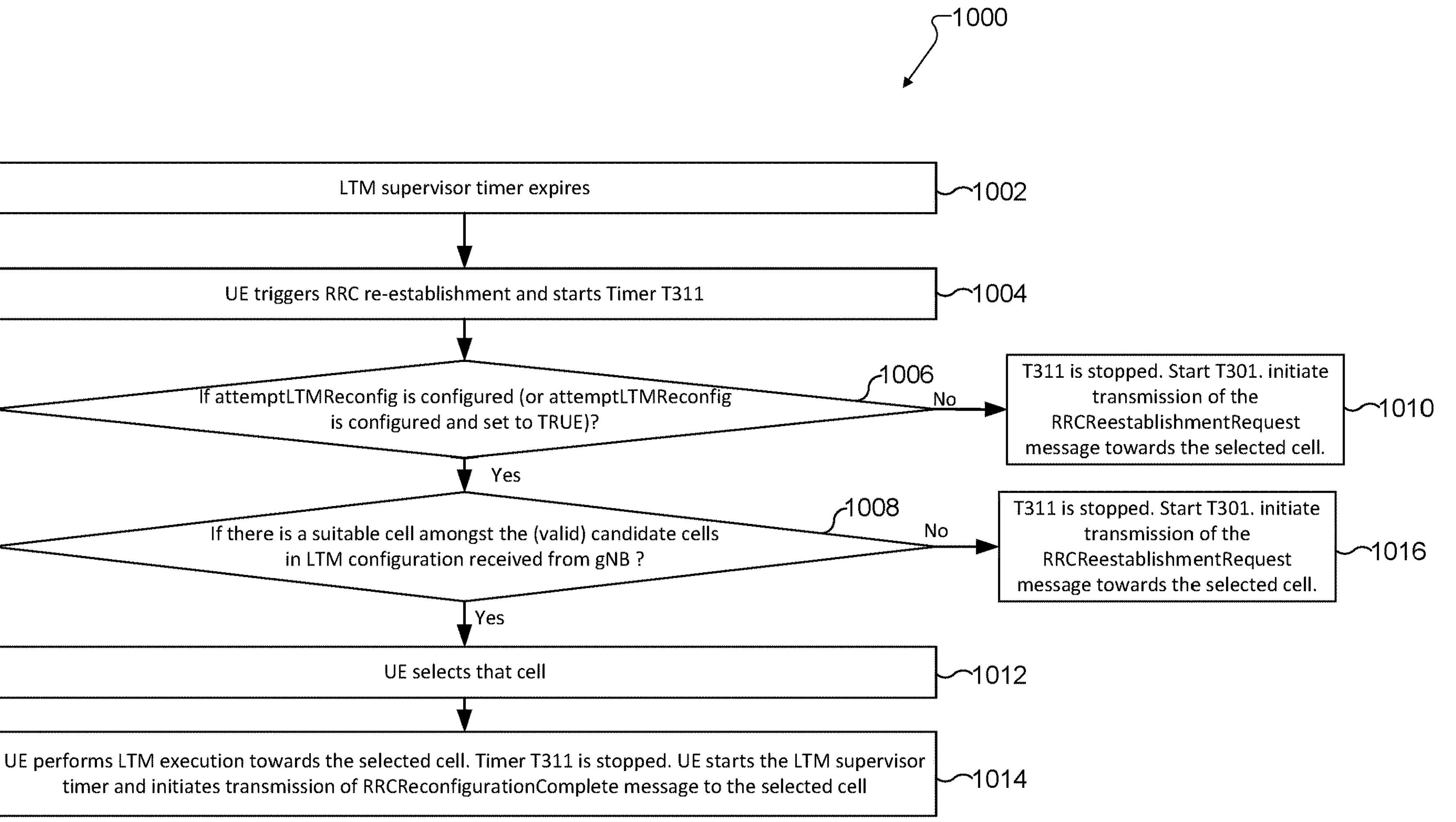
FIG. 10 illustrates another procedure for RRC reestablishment according to embodiments of the present disclosure.

In one embodiment, when an LTM supervisor timer expires such as at step 17 of FIG. 5 (or when a RLF timer/T310 expires; or upon a random access problem indication from the MCG MAC while neither T300, T301, T304, T311 nor T319, LTM supervision timer are running and SDT procedure is not ongoing; or upon indication from the MCG RLC that the maximum number of retransmissions has been reached while SDT procedure is not ongoing; or upon consistent uplink LBT failure indication from the MCG MAC while T304 and the LTM supervision timer are not running; or upon detection of a radio link failure; or if the LTM cell switch is considered failed e.g., because a TCI state/RS [e.g., SSB/CSI RS/TRS] indicated by the UE is not suitable i.e., its RSRP/RSRQ is less/less than equal to a configured threshold), the UE performs the operation shown in FIG. 10.

FIG. 10 illustrates another procedure 1000 for RRC reestablishment according to embodiments of the present disclosure. An embodiment of the procedure illustrated in FIG. 10 is for illustration only. One or more of the components illustrated in FIG. 10 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In the example of FIG. 10, the process begins at step 1002. At step 1002, an LTM supervisor timer expires, similar to step 17 of FIG. 5. At step 1004, a UE such as UE 502 of FIG. 5 triggers/initiates RRC connection re-establishment and starts Timer T311.

At step 1006 if attemptLTMReconfig is configured i.e. if attemptLTMReconfig field/parameter is received in the LTM configuration received from the gNB (e.g., in step 10 of FIG. 5) (or attemptLTMReconfig is configured i.e. if attemptLTMReconfig field/parameter is received in the LTM configuration received from the gNB (e.g., in step 10 of FIG. 5) and set to TRUE), the process proceeds to step 1008. Otherwise, the process proceeds to step 1010.

At step 1008, if there is a suitable cell amongst the (valid) candidate cells (the candidate cell in the LTM configuration for which LTM execution has failed is not considered valid) in LTM configuration received from the gNB (e.g., in step 10 of FIG. 5), or if there is a suitable cell amongst the (valid) candidate cells (the candidate cell in LTM configuration for which LTM execution has failed is not considered valid) in LTM configuration received from the gNB (e.g., in step 10 of FIG. 5) and the gNB has indicated that LTM execution can be performed towards this cell upon LTM failure, the process proceeds to step 1012. Otherwise, the process proceeds to step 1016. In one embodiment, a valid candidate cell is the cell for which the reconfigurationWithSync/ltmCellSwitchInfo IE is included in the LTM configuration and the cell belongs to the MCG or alternately, a valid candidate cell is the cell for which the reconfigurationWithSync/ltmCellSwitchInfo IE is included in the LTM configuration.

At step 1012, the UE selects that cell while T311 is running. In case multiple candidate cells meet the above criteria, the UE may select the one which has valid TA and/or has the highest RSRP/RSRQ.

At step 1014, the UE initiates LTM execution towards the selected cell. Timer T311 is stopped. The UE starts the LTM supervisor timer and initiates transmission of a RRCReconfigurationComplete message to the selected cell.

In one embodiment, if the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

On one embodiment, if the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The LTM supervisor timer is stopped when the random-access procedure is successfully completed. The UE stops the LTM supervisor timer when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling the new DL TB is received from the selected cell.

In one embodiment the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

In one embodiment, if the configured grant configuration for LTM cell switch is configured and the UE has valid TA (or UE has estimated TA) for the selected cell, the UE does not initiate random access towards the selected cell. The UE transmits the RRCReconfigurationComplete message to the selected cell in an UL grant (pre-configured UL grant or dynamic UL grant received from the selected cell). The pre-configured UL grant may be received by the UE in the selected cell's LTM configuration (e.g., in step 10 of FIG. 5). The UE stops the LTM supervisor timer when the UE determines the NW (i.e., selected cell) has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell. Otherwise, (e.g., if the configured grant configuration for LTM cell switch is not configured or if UE does not have valid TA (or UE does not have estimated TA) for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

At step 1010, the UE selects a suitable NR cell while T311 is running. Upon selecting the cell, the UE stops T311, starts T301 and initiates transmission of the RRCReestablishmentRequest message towards the selected cell.

At step 1016, the UE selects a suitable NR cell while T311 is running. Upon selecting the cell, the UE stops T311, starts T301 and initiates transmission of the RRCReestablishmentRequest message towards the selected cell.

The attemptLTMReconfig field indicates whether the UE can perform LTM executions towards one of the candidate cell in LTM configuration received from the gNB (e.g., in step 10 of FIG. 5). attemptLTMReconfig can be signaled by the gNB in a configuration received from gNB (e.g., in step 10 of FIG. 5). If the attemptLTMReconfig field is present in the LTM configuration, the UE shall perform LTM reconfiguration if the selected cell is a candidate cell in the LTM configuration, and it is the first cell selection after the LTM failure. Alternately, if the attemptLTMReconfig field is present in the LTM configuration, the UE shall perform LTM reconfiguration if the selected cell is a candidate cell in the LTM configuration.

Although FIG. 10 illustrates one example of a procedure 1000 for RRC reestablishment, various changes may be made to FIG. 10. For example, while shown as a series of steps, various steps in FIG. 10 could overlap, occur in parallel, occur in a different order, occur any number of times, be omitted, or replaced by other steps.

Figure 11:
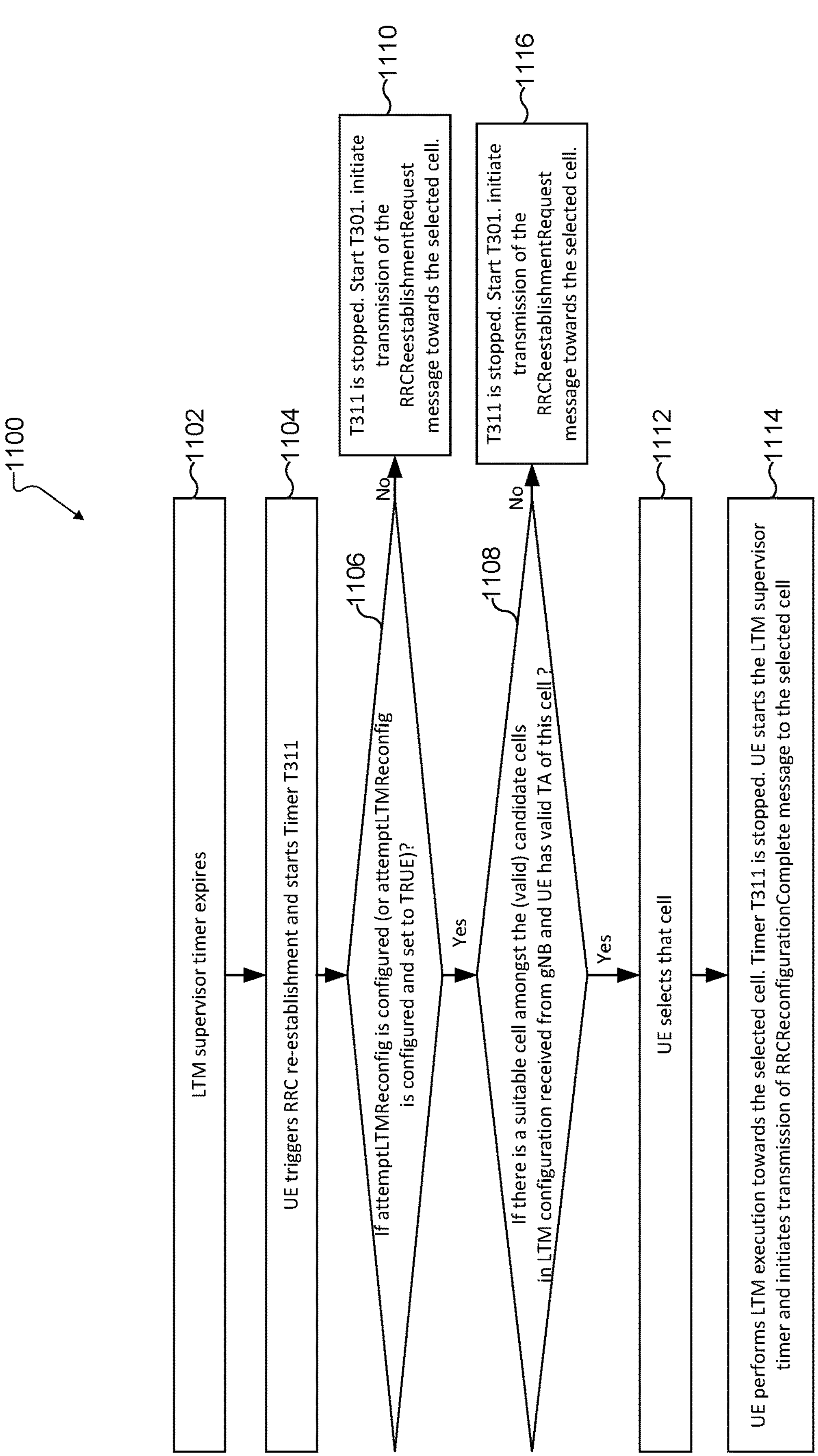
FIG. 11 illustrates another procedure for RRC reestablishment according to embodiments of the present disclosure.

In one embodiment, when an LTM supervisor timer expires such as at step 17 of FIG. 5 (or when a RLF timer expires; or upon a random access problem indication from the MCG MAC while neither T300, T301, T304, T311 nor T319, LTM supervision timer are running and SDT procedure is not ongoing; or upon indication from the MCG RLC that the maximum number of retransmissions has been reached while SDT procedure is not ongoing; or upon consistent uplink LBT failure indication from the MCG MAC while T304 and the LTM supervision timer are not running; or upon detection of a radio link failure; or if the LTM cell switch is considered failed e.g., because a TCI state/RS [e.g., SSB/CSI RS/TRS] indicated by the UE is not suitable i.e., its RSRP/RSRQ is less/less than equal to a configured threshold), the UE performs the operation shown in FIG. 11.

FIG. 11 illustrates another procedure 1100 for RRC reestablishment according to embodiments of the present disclosure. An embodiment of the procedure illustrated in FIG. 11 is for illustration only. One or more of the components illustrated in FIG. 11 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In the example of FIG. 11, the process begins at step 1102. At step 1102, an LTM supervisor timer expires, similar to step 17 of FIG. 5. At step 1104, a UE such as UE 502 of FIG. 5 triggers/initiates RRC connection re-establishment and starts Timer T311.

At step 1106, if attemptLTMReconfig is configured (or attemptLTMReconfig is configured and set to TRUE), the process proceeds to step 1008. Otherwise, the process proceeds to step 1010.

At step 1108 if there is a suitable cell amongst the (valid) candidate cells (the candidate cell in LTM configuration for which LTM execution has failed is not considered valid) in LTM configuration received from gNB (e.g., in step 10 of FIG. 5) and UE has valid TA of this cell (In an embodiment, valid candidate cell is the cell for which reconfigurationWithSync/ltmCellSwitchInfo IE is included in the LTM configuration and cell belongs to MCG or alternately, valid candidate cell is the cell for which reconfigurationWithSync/ltmCellSwitchInfo IE is included in the LTM configuration); or if there is a suitable cell amongst the (valid) candidate cells (the candidate cell in LTM configuration for which LTM execution has failed is not considered valid) in LTM configuration received from gNB (e.g., in step 10 of FIG. 5) and the gNB has indicated that LTM execution can be performed towards this cell upon LTM failure and the UE has valid TA for this cell (In an embodiment, valid candidate cell is the cell for which reconfigurationWithSync/ltmCellSwitchInfo IE is included in the LTM configuration and cell belongs to MCG or alternately, valid candidate cell is the cell for which reconfigurationWithSync/ltmCellSwitchInfo IE is included in the LTM configuration), the process proceeds to step 1112. Otherwise, the process proceeds to step 1116.

At step 1112, the UE selects that cell while T311 is running. In case multiple candidate cells meet the above criteria, the UE may select the one which has the highest RSRP/RSRQ.

At step 1114, the UE initiates LTM execution towards the selected cell. Timer T311 is stopped. The UE starts the LTM supervisor timer and initiates transmission of a RRCReconfigurationComplete message to the selected cell. The UE transmits the RRCReconfigurationComplete message to the selected cell in UL grant (pre-configured UL grant or dynamic UL grant received from the selected cell). The UE stops the LTM supervisor timer, when the UE determines the NW has successfully received its first UL data. In an embodiment, the UE stops the LTM supervisor timer if PDCCH addressed to C-RNTI scheduling UL grant for new transmission is received from the selected cell. In an embodiment, the UE stops the LTM supervisor timer if PDCCH addressed to C-RNTI scheduling new DL TB is received from the selected cell.

At step 1110, the UE selects a suitable NR cell while T311 is running. Upon selecting the cell, the UE stops T311, starts T301 and initiates transmission of the RRCReestablishmentRequest message towards the selected cell.

At step 1116, the UE selects a suitable NR cell while T311 is running. Upon selecting the cell, the UE stops T311, starts T301 and initiates transmission of the RRCReestablishmentRequest message towards the selected cell.

The attemptLTMReconfig field indicates whether UE can perform LTM executions towards one of the candidate cells in the LTM configuration received from the gNB (e.g., in step 10 of FIG. 5). attemptLTMReconfig can be signaled by the gNB in a configuration received from the gNB (e.g., in step 10 of FIG. 5). If the attemptLTMReconfig field is present in the LTM configuration, the UE shall perform the LTM reconfiguration if the selected cell is a candidate cell in the LTM configuration, and it is the first cell selection after the LTM failure. Alternately, if the attemptLTMReconfig field is present in the LTM configuration, the UE shall perform LTM reconfiguration if the selected cell is a candidate cell in the LTM configuration.

Although FIG. 11 illustrates one example of a procedure 1100 for RRC reestablishment, various changes may be made to FIG. 11. For example, while shown as a series of steps, various steps in FIG. 11 could overlap, occur in parallel, occur in a different order, occur any number of times, be omitted, or replaced by other steps.

In addition to LTM configuration the UE may have received a conditional handover configuration from gNB in the RRCReconfiguration message.

Figure 12:
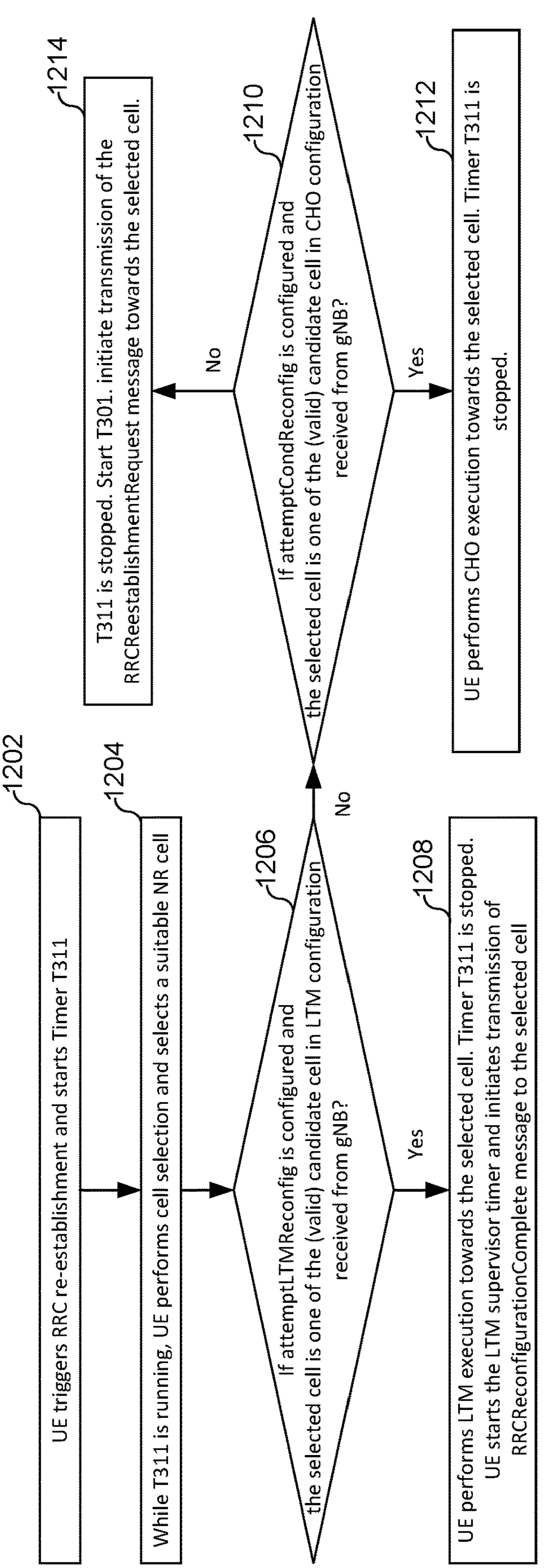
FIG. 12 illustrates another procedure for RRC reestablishment according to embodiments of the present disclosure.

In one embodiment, when an LTM supervisor timer expires such as at step 17 of FIG. 5 (or when a RLF timer/T310 expires; or upon a random access problem indication from the MCG MAC while neither T300, T301, T304, T311 nor T319, LTM supervision timer are running and SDT procedure is not ongoing; or upon indication from the MCG RLC that the maximum number of retransmissions has been reached while SDT procedure is not ongoing; or upon consistent uplink LBT failure indication from the MCG MAC while T304 and the LTM supervision timer are not running; or upon detection of a radio link failure; or if the LTM cell switch is considered failed e.g., because a TCI state/RS [e.g., SSB/CSI RS/TRS] indicated by the UE is not suitable i.e., its RSRP/RSRQ is less/less than equal to a configured threshold), the UE performs the operation shown in FIG. 12.

FIG. 12 illustrates another procedure 1200 for RRC reestablishment according to embodiments of the present disclosure. An embodiment of the procedure illustrated in FIG. 12 is for illustration only. One or more of the components illustrated in FIG. 12 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In one embodiment, a valid LTM candidate cell is the cell for which a reconfigurationWithSync/ltmCellSwitchInfo IE is included in the LTM configuration and the cell belongs to the MCG or alternately, the valid candidate cell is the cell for which the reconfigurationWithSync/ltmCellSwitchInfo IE is included in the LTM configuration.

In the example of FIG. 12, the process begins at step 1202. At step 1202, a UE such as UE 502 of FIG. 5 triggers/ initiates RRC connection re-establishment and starts Timer T311. At step 1204, while T311 is running, the UE performs cell selection and selects a suitable NR cell.

At step 1206, if attemptLTMReconfig is configured i.e. if attemptLTMReconfig field/parameter is received in the LTM configuration received from the gNB (e.g., in step 10 of FIG. 5) (or attemptLTMReconfig is configured i.e. if attemptLTMReconfig field/parameter is received in the LTM configuration received from the gNB (e.g., in step 10 of FIG. 5) and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5); or if attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from gNB (e.g., in step 10 of FIG. 5) and for which UE has valid TA; or If attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure; or if attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and for which the UE has valid TA and the gNB has indicated that LTM execution can be performed towards this cell upon LTM failure, the process proceeds to step 1208. Otherwise, the process proceeds to step 1210.

At step 1208, the UE performs LTM execution towards the selected cell. Timer T311 is stopped, the UE starts the LTM supervisor timer and initiates transmission of a RRCReconfigurationComplete message to the selected cell. If the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. If the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The UE stops the LTM supervisor timer when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell.

In one embodiment the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. In one embodiment, if a configured grant configuration for LTM cell switch is configured and the UE has valid TA (or the UE has estimated TA) for the selected cell, the UE does not initiate random access towards the selected cell. The UE transmits the RRCReconfigurationComplete message to the selected cell in an UL grant (pre-configured UL grant or dynamic UL grant received from the selected cell). The pre-configured UL grant may be received by the UE in the selected cell's LTM configuration (e.g., in step 10 of FIG. 5). The UE stops the LTM supervisor timer when the UE determines the NW (i.e., selected cell) has successfully received its first UL data. In one embodiment, the UE stops the LTM supervisor timer if a PDCCH addressed to the C-RNTI scheduling the UL grant for new transmission is received from the selected cell. In an embodiment, the UE stops the LTM supervisor timer if PDCCH addressed to C-RNTI scheduling new DL TB is received from the selected cell. Otherwise, (e.g., if the configured grant configuration for LTM cell switch is not configured or if the UE does not have valid TA (or UE does not have estimated TA) for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

At step 1210, if attemptCondReconfig is configured (or attemptCondReconfig is configured and set to TRUE) the selected cell is one of the (valid) candidate cells in the CHO configuration received from the gNB (the valid candidate cell is the one which is not configured with CondEventT1 or is configured with CondEventT1 but the leaving condition has not been fulfilled; and is the cell for which reconfigurationWithSync is included in the CHO configuration and cell belongs to MCG), the process proceeds to step 1212. Otherwise, the process proceeds to step 1214.

At step 1212, the UE performs CHO execution towards the selected cell, and Timer T311 is stopped.

At step 1214, T311 is stopped. The UE Starts T301, and initiates transmission of the RRCReestablishmentRequest message towards the selected cell.

The attemptLTMReconfig field indicates whether the UE can perform LTM executions towards one of the candidate cells in the LTM configuration received from gNB in step 10 of FIG. 5. attemptLTMReconfig can be signaled by the gNB in a configuration received from the gNB in step 10 of FIG. 5. If the attemptLTMReconfig field is present in the LTM configuration, the UE shall perform the LTM reconfiguration if the selected cell is a candidate cell in the LTM configuration, and it is the first cell selection after the LTM failure. Alternately, if the attemptLTMReconfig field is present in the LTM configuration, the UE shall perform LTM reconfiguration if the selected cell is a candidate cell in the LTM configuration.

The attemptCondReconfig field indicates whether the UE can perform CHO executions towards one of the candidate cells in the CHO configuration received from the gNB. attemptCondReconfig can be signaled by the gNB in a configuration received from the gNB. If the attemptCondReconfig field is present in the LTM configuration, the UE shall perform CHO reconfiguration if the selected cell is a candidate cell in the CHO configuration and it is the first cell selection after the LTM failure/CHO failure. Alternately, if the attemptCondReconfig field is present in the CHO configuration, the UE shall perform the CHO reconfiguration if the selected cell is a candidate cell in the CHO configuration.

Although FIG. 12 illustrates one example of a procedure 1200 for RRC reestablishment, various changes may be made to FIG. 12. For example, while shown as a series of steps, various steps in FIG. 12 could overlap, occur in parallel, occur in a different order, occur any number of times, be omitted, or replaced by other steps.

In addition to LTM configuration, the UE may have received a conditional handover configuration from the gNB in the RRCReconfiguration message.

Figure 13:
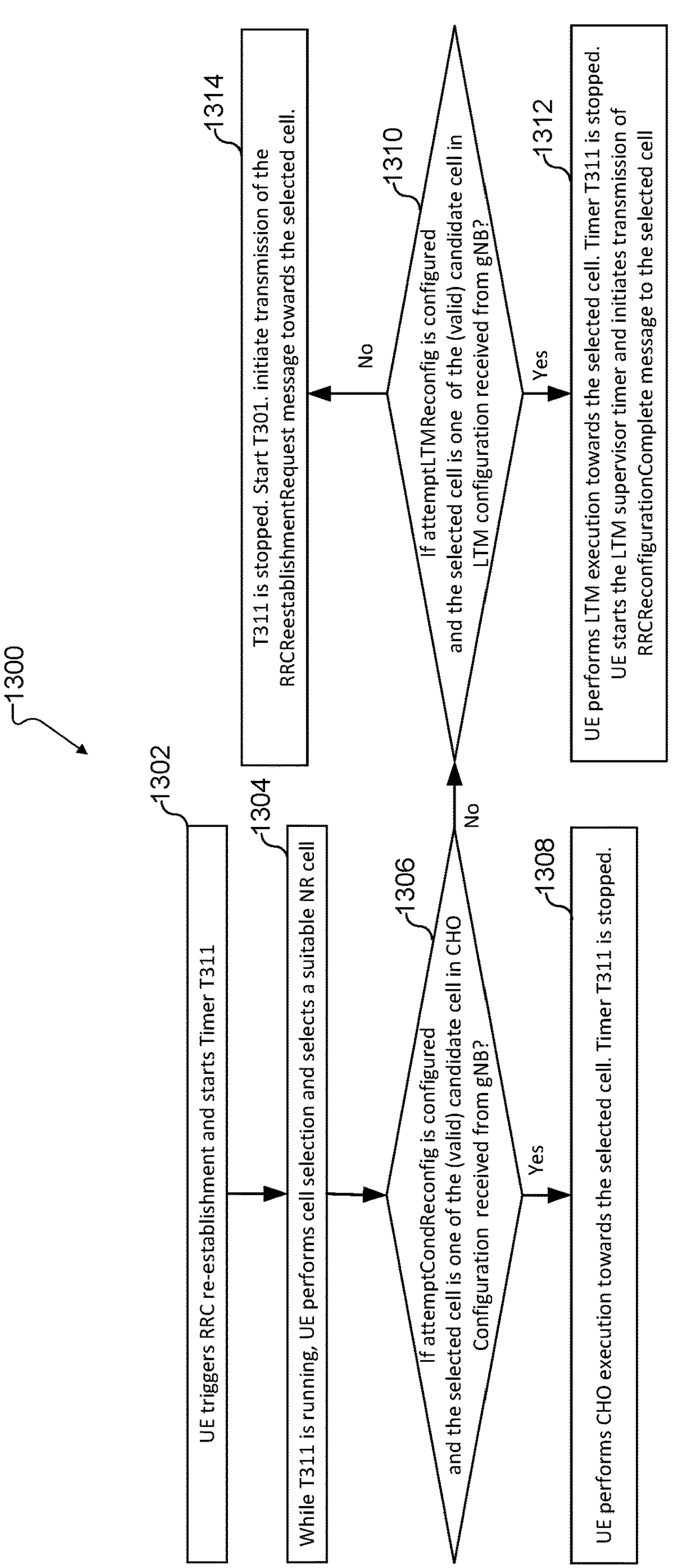
FIG. 13 illustrates another procedure for RRC reestablishment according to embodiments of the present disclosure.

In one embodiment, when an LTM supervisor timer expires such as at step 17 of FIG. 5 (or when a RLF timer/T310 expires; or upon a random access problem indication from the MCG MAC while neither T300, T301, T304, T311 nor T319, LTM supervision timer are running and SDT procedure is not ongoing; or upon indication from the MCG RLC that the maximum number of retransmissions has been reached while SDT procedure is not ongoing; or upon consistent uplink LBT failure indication from the MCG MAC while T304 and the LTM supervision timer are not running; or upon detection of a radio link failure; or if the LTM cell switch is considered failed e.g., because a TCI state/RS [e.g., SSB/CSI RS/TRS] indicated by the UE is not suitable i.e., its RSRP/RSRQ is less/less than equal to a configured threshold), the UE performs the operation shown in FIG. 13.

FIG. 13 illustrates another procedure 1300 for RRC reestablishment according to embodiments of the present disclosure. An embodiment of the procedure illustrated in FIG. 13 is for illustration only. One or more of the components illustrated in FIG. 13 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In one embodiment, a valid LTM candidate cell is the cell for which a reconfigurationWithSync/ltmCellSwitchInfo IE is included in the LTM configuration and the cell belongs to the MCG or alternately, the valid candidate cell is the cell for which the reconfigurationWithSync/ltmCellSwitchInfo IE is included in the LTM configuration.

In the example of FIG. 13, the process begins at step 1302. At step 1302, a UE such as UE 502 of FIG. 5 triggers/initiates RRC connection re-establishment and starts Timer T311. At step 1304, while T311 is running, the UE performs cell selection and selects a suitable NR cell.

At step 1306, if attemptCondReconfig is configured (or attemptCondReconfig is configured and set to TRUE) the selected cell is one of the (valid) candidate cell in CHO configuration received from gNB (the valid candidate cell is the one which is not configured with CondEventT1 or is configured with CondEventT1 but the leaving condition has not been fulfilled; and is the cell for which reconfigurationWithSync is included in the CHO configuration and the cell belongs to the MCG), the process proceeds to step 1308. Otherwise, the process proceeds to step 1310.

At step 1308, the UE performs CHO execution towards the selected cell, and Timer T311 is stopped.

At step 1310, if attemptLTMReconfig is configured i.e. if attemptLTMReconfig field/parameter is received in the LTM configuration received from the gNB (e.g., in step 10 of FIG. 5) (or attemptLTMReconfig is configured i.e. if attemptLTMReconfig field/parameter is received in the LTM configuration received from the gNB (e.g., in step 10 of FIG. 5) and set to TRUE) and the selected cell is one of the (valid) candidate cells (the candidate cell in the LTM configuration for which LTM execution has failed is not considered valid) in LTM configuration received from the gNB (e.g., in step 10 of FIG. 5); or if attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and for which UE has valid TA; or if attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure; or if attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and for which the UE has valid TA and the gNB has indicated that LTM execution can be performed towards this cell upon LTM failure, the process proceeds to step 1312. Otherwise, the process proceeds to step 1314.

At step 1312 the UE performs LTM execution towards the selected cell. Timer T311 is stopped, the UE starts the LTM supervisor timer and initiates transmission of RRCReconfigurationComplete message to the selected cell. If the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. If the UE has valid TA for the selected cell, the UE does not initiate random access towards the selected cell. The UE transmits the RRCReconfigurationComplete message to the selected cell in UL grant (pre-configured UL grant or dynamic UL grant received from the selected cell). The UE stops the LTM supervisor timer, when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell.

In one embodiment, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. In one embodiment, if the configured grant configuration for LTM cell switch is configured and the UE has valid TA (or UE has estimated TA) for the selected cell, the UE does not initiate random access towards the selected cell. The UE transmits the RRCReconfigurationComplete message to the selected cell in an UL grant (pre-configured UL grant or dynamic UL grant received from the selected cell).

The pre-configured UL grant may be received by UE in the selected cell's LTM configuration (e.g., in step 10 of FIG. 5). The UE stops the LTM supervisor timer when the UE determines the NW (i.e., selected cell) has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if the PDCCH addressed to the C-RNTI scheduling new DL TB is received from the selected cell. Otherwise, (e.g., if the configured grant configuration for LTM cell switch is not configured or if UE does not have valid TA (or UE does not have estimated TA) for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of the LTM cell switch i.e., the LTM supervisor timer is stopped when the random-access procedure is successfully completed.

At step 1314, T311 is stopped. The UE Starts T301, and initiates transmission of the RRCReestablishmentRequest message towards the selected cell.

Although FIG. 13 illustrates one example of a procedure 1300 for RRC reestablishment, various changes may be made to FIG. 13. For example, while shown as a series of steps, various steps in FIG. 13 could overlap, occur in parallel, occur in a different order, occur any number of times, be omitted, or replaced by other steps.

In addition to LTM configuration the UE may have received a conditional handover configuration from the gNB in RRCReconfiguration message.

Figure 14:
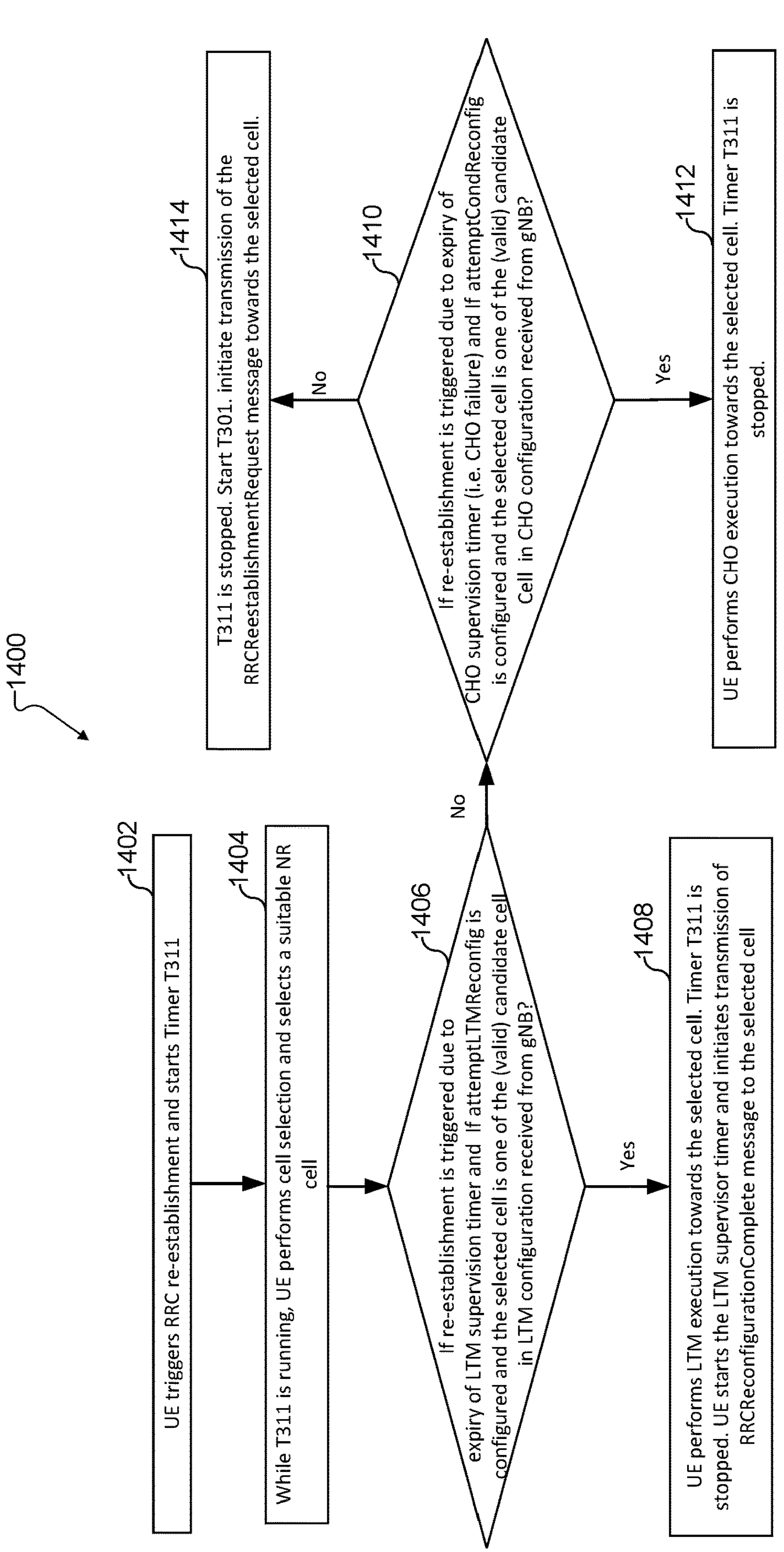
FIG. 14 illustrates another procedure for RRC reestablishment according to embodiments of the present disclosure.

In one embodiment, when an LTM supervisor timer expires such as at step 17 of FIG. 5 (or in case of CHO failure), the UE performs the operation shown in FIG. 14.

FIG. 14 illustrates another procedure 1400 for RRC reestablishment according to embodiments of the present disclosure. An embodiment of the procedure illustrated in FIG. 14 is for illustration only. One or more of the components illustrated in FIG. 14 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In one embodiment, a valid LTM candidate cell is the cell for which a reconfigurationWithSync ltmCellSwitchInfo IE is included in the LTM configuration and the cell belongs to the MCG or alternately, the valid candidate cell is the cell for which the reconfigurationWithSync ltmCellSwitchInfo IE is included in the LTM configuration.

In the example of FIG. 14, the process begins at step 1402. At step 1402, a UE such as UE 502 of FIG. 5 triggers/initiates RRC connection re-establishment and starts Timer T311.

At step 1404, while T311 is running, the UE performs cell selection and selects a suitable NR cell.

At step 1406, if re-establishment is triggered due to expiry of the LTM supervision timer and if attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5); or if re-establishment is triggered due to expiry of the LTM supervision timer and if attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and for which the UE has valid TA; or if re-establishment is triggered due to expiry of the LTM supervision timer and if attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure; or if re-establishment is triggered due to expiry of the LTM supervision timer and if attemptLTMReconfig is configured (or attemptLTMReconfig is configured and set to TRUE) and the selected cell is one of the (valid) candidate cells (the candidate cell in LTM configuration for which LTM execution has failed is not considered valid) in the LTM configuration received from the gNB (e.g., in step 10 of FIG. 5) and for which UE has valid TA and the gNB has indicated that LTM execution can be performed towards this cell upon LTM failure, the process proceeds to step 1408. Otherwise, the process proceeds to step 1410.

At step 1408, the UE performs LTM execution towards the selected cell. Timer T311 is stopped, and the UE starts the LTM supervisor timer and initiates transmission of an RRCReconfigurationComplete message to the selected cell. If the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. If the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The UE stops the LTM supervisor timer when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell.

In one embodiment, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

In one embodiment, if the configured grant configuration for LTM cell switch is configured and the UE has valid TA (or UE has estimated TA) for the selected cell, the UE does not initiate random access towards the selected cell. The UE transmits the RRCReconfigurationComplete message to the selected cell in a UL grant (pre-configured UL grant or dynamic UL grant received from the selected cell). The pre-configured UL grant may be received by the UE in the selected cell's LTM configuration (e.g., in step 10 of FIG. 5). The UE stops the LTM supervisor timer when the UE determines the NW (i.e., selected cell) has successfully received its first UL data. In one embodiment, the UE stops the LTM supervisor timer if a PDCCH addressed to the C-RNTI scheduling an UL grant for new transmission is received from the selected cell. In one embodiment, the UE stops the LTM supervisor timer if a PDCCH addressed to the C-RNTI scheduling new DL TB is received from the selected cell. Otherwise, (e.g., if the configured grant configuration for LTM cell switch is not configured or if UE does not have valid TA (or UE does not have estimated TA) for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

At step 1410, if re-establishment is triggered due to expiry of the CHO supervision timer (i.e., CHO failure) and If attemptCondReconfig is configured (or attemptCondReconfig is configured and set to TRUE) the selected cell is one of the (valid) candidate cells in the CHO configuration received from the gNB (the valid candidate cell is the one which is not configured with CondEventT1 or is configured with CondEventT1 but the leaving condition has not been fulfilled; and is the cell for which reconfigurationWithSync is included in the CHO configuration and the cell belongs to the MCG), the process proceeds to step 1412. Otherwise, the process proceeds to step 1414.

At step 1412, the UE performs CHO execution towards the selected cell, and Timer T311 is stopped.

At step 1414, T311 is stopped. The UE Starts T301, and initiates transmission of the RRCReestablishmentRequest message towards the selected cell.

Although FIG. 14 illustrates one example of a procedure 1400 for RRC reestablishment, various changes may be made to FIG. 14. For example, while shown as a series of steps, various steps in FIG. 14 could overlap, occur in parallel, occur in a different order, occur any number of times, be omitted, or replaced by other steps.

In addition to LTM configuration the UE may have received conditional handover configuration from gNB in RRCReconfiguration message.

In one embodiment, when the LTM supervisor timer expires (or when the RLF timer/T310 expires or upon a random access problem indication from the MCG MAC while neither T300, T301, T304, T311 nor T319, LTM supervision timer are running and SDT procedure is not ongoing; or upon indication from the MCG RLC that the maximum number of retransmissions has been reached while SDT procedure is not ongoing; or upon a consistent uplink LBT failure indication from the MCG MAC while T304 and LTM supervision timer are not running or in case of CHO failure), UE performs the following operation:

- In one embodiment, a valid LTM candidate cell is the cell for which a reconfigurationWithSync/ltmCellSwitchInfo IE is included in the LTM configuration and the cell belongs to MCG or alternately, a valid candidate cell is the cell for which a reconfigurationWithSync/ltmCellSwitchInfo IE is included in the LTM configuration
- UE triggers/initiates RRC connection re-establishment and starts Timer T311.
- While T311 is running, the UE performs cell selection and selects a suitable NR cell.

If re-establishment is triggered due to expiry of LTM supervision timer:

- If attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from gNB (e.g., in step 10 of FIG. 5): or
- If attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from gNB (e.g., in step 10 of FIG. 5) and for which the UE has valid TA: or
- If attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from gNB (e.g., in step 10 of FIG. 5) and the gNB has indicated that LTM execution can be performed towards this cell upon LTM failure: or
- If attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from gNB (e.g., in step 10 of FIG. 5) and for which the UE has valid TA and the gNB has indicated that LTM execution can be performed towards this cell upon LTM failure:
  - The UE performs LTM execution towards the selected cell. Timer T311 is stopped.
  - The UE starts the LTM supervisor timer and initiates transmission of a RRCReconfigurationComplete message to the selected cell.
  - In one embodiment, if the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.
  - In one embodiment, If the UE has valid TA for the selected cell, the UE does not initiate random access towards the selected cell. The UE transmits the RRCReconfigurationComplete message to the selected cell in the UL grant (pre-configured UL grant or dynamic UL grant received from the selected cell). The UE stops the LTM supervisor timer when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell.

In one embodiment the UE initiates random access towards the selected cell. During the random-access procedure, the UE transmits the RRCReconfigurationComplete message to the selected cell in a Msg3 or MsgA.

The UE stops the LTM supervisor timer upon successful completion of the LTM cell switch i.e., the LTM supervisor timer is stopped when the random-access procedure is successfully completed.

In one embodiment:

if the configured grant configuration for LTM cell switch is configured and the UE has valid TA (or the UE has estimated TA) for the selected cell:

The UE does not initiate random access towards the selected cell. The UE transmits the RRCReconfigurationComplete message to the selected cell in an UL grant (pre-configured UL grant or dynamic UL grant received from the selected cell). The pre-configured UL grant may be received by the UE in the selected cell's LTM configuration (e.g., in step 10 of FIG. 5). The UE stops the LTM supervisor timer when the UE determines the NW (i.e., selected cell) has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell.

Otherwise, (e.g., if the configured grant configuration for LTM cell switch is not configured or if the UE does not have valid TA (or the UE does not have estimated TA) for the selected cell:

The UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

Otherwise, if attemptCondReconfig is configured (or attemptCondReconfig is configured and set to TRUE) and the selected cell is one of the (valid) candidate cell in CHO configuration received from the gNB:

The UE performs CHO execution towards the selected cell. Timer T311 is stopped.

Otherwise:

T311 is stopped. The UE starts T301 and initiates transmission of the RRCReestablishmentRequest message towards the selected cell.

If re-establishment is triggered due to expiry of the CHO supervision timer (i.e., CHO failure)

If attemptCondReconfig is configured (or attemptCondReconfig is configured and set to TRUE) and the selected cell is one of the (valid) candidate cells in the CHO configuration received from the gNB (the valid candidate cell is the one which is not configured with CondEventT1 or is configured with CondEventT1, but the leaving condition has not been fulfilled; and is the cell for which reconfigurationWithSync is included in the CHO configuration and cell belongs to MCG):

The UE performs CHO execution towards the selected cell. Timer T311 is stopped.

Otherwise, If attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5): or If attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and for which the UE has valid TA: or o If attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure: or If attemptLTMReconfig is configured (or attemptLTMReconfig is configured and set to TRUE) and the selected cell is one of the (valid) candidate cells (the candidate cell in the LTM configuration for which LTM execution has failed is not considered valid) in the LTM configuration received from the gNB (e.g., in step 10 of FIG. 5) and for which UE has valid TA and the gNB has indicated that LTM execution can be performed towards this cell upon LTM failure:

The UE performs LTM execution towards the selected cell. Timer T311 is stopped.

The UE starts the LTM supervisor timer and initiates transmission of a RRCReconfigurationComplete message to the selected cell.

If the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of the LTM cell switch i.e., the LTM supervisor timer is stopped when the random-access procedure is successfully completed. If the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The LTM supervisor timer is stopped when the random-access procedure is successfully completed. The UE stops the LTM supervisor timer when the UE determines the NW has successfully received its first UL data.

In one embodiment UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

Otherwise:

T311 is stopped. The UE starts T301, and initiates transmission of the RRCReestablishmentRequest message towards the selected cell.

Figure 15:
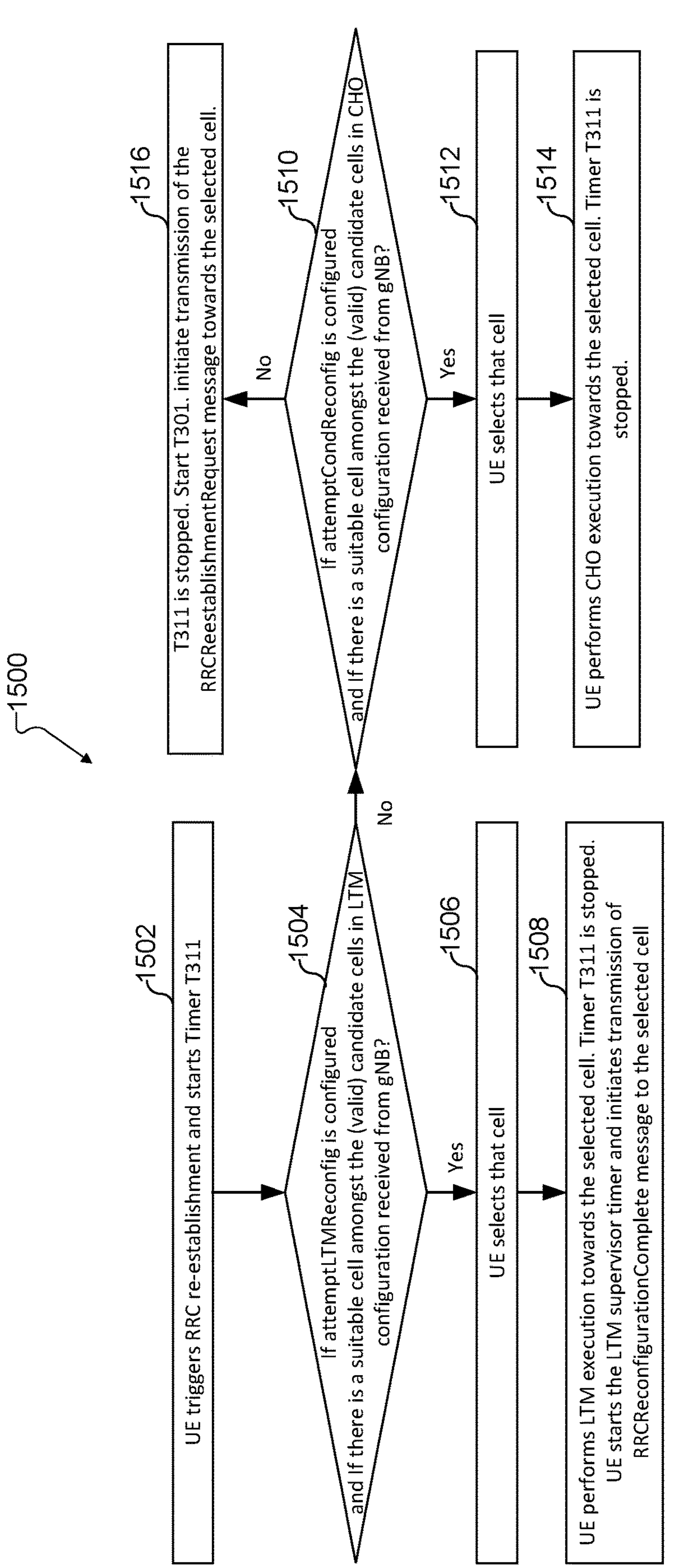
FIG. 15 illustrates another procedure for RRC reestablishment according to embodiments of the present disclosure.

In one embodiment, when an LTM supervisor timer expires such as at step 17 of FIG. 5, the UE performs the operation illustrated in FIG. 15.

FIG. 15 illustrates another procedure 1500 for RRC reestablishment according to embodiments of the present disclosure. An embodiment of the procedure illustrated in FIG. 15 is for illustration only. One or more of the components illustrated in FIG. 15 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In one embodiment, a valid LTM candidate cell is the cell for which a reconfigurationWithSync ltmCellSwitchInfo IE is included in the LTM configuration and the cell belongs to the MCG or alternately, the valid candidate cell is the cell for which the reconfigurationWithSync ltmCellSwitchInfo IE is included in the LTM configuration.

In the example of FIG. 15, the process begins at step 1502. At step 1502, a UE such as UE 502 of FIG. 5 triggers/initiates RRC connection re-establishment and starts Timer T311.

At step 1504, if attemptLTMReconfig is configured i.e. if attemptLTMReconfig field/parameter is received in the LTM configuration received from the gNB (e.g., in step 10 of FIG. 5) (or attemptLTMReconfig is configured i.e. if attemptLTMReconfig field/parameter is received in the LTM configuration received from the gNB (e.g., in step 10 of FIG. 5) and set to TRUE) and if there is a suitable cell amongst the (valid) candidate cells (the candidate cell in LTM configuration for which LTM execution has failed is not considered valid) in the LTM configuration received from the gNB (e.g., in step 10 of FIG. 5); or if attemptLTMReconfig is configured (or attemptLTMReconfig is configured and set to TRUE) and if there is a suitable cell amongst the (valid) candidate cells (the candidate cell in LTM configuration for which LTM execution has failed is not considered valid) in the LTM configuration received from the gNB (e.g., in step 10 of FIG. 5) and the gNB has indicated that LTM execution can be performed towards this cell upon LTM failure; or if attemptLTMReconfig is configured (or attemptLTMReconfig is configured and set to TRUE) and if there is a suitable cell amongst the (valid) candidate cells (the candidate cell in LTM configuration for which LTM execution has failed is not considered valid) in the LTM configuration received from the gNB (e.g., in step 10 of FIG. 5) and the UE has valid TA of this cell (FIG. 11); or if attemptLTMReconfig is configured (or attemptLTMReconfig is configured and set to TRUE) and if there is a suitable cell amongst the (valid) candidate cells (the candidate cell in LTM configuration for which LTM execution has failed is not considered valid) in the LTM configuration received from the gNB (e.g., in step 10 of FIG. 5) and the gNB has indicated that LTM execution can be performed towards this cell upon LTM failure and the UE has valid TA for this cell, the process proceeds to step 1506. Otherwise, the process proceeds to step 1510.

At step 1506, the UE selects that cell while T311 is running. In case multiple candidate cells meet the above criteria, the UE may select the one which has valid TA and/or has the highest RSRP/RSRQ.

At step 1508, the UE initiates LTM execution towards the selected cell. Timer T311 is stopped. The UE starts the LTM supervisor timer and initiates transmission of a RRCReconfigurationComplete message to the selected cell. If the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. If the UE has valid TA for the selected cell, the UE does not initiate random access towards the selected cell. The UE transmits the RRCReconfigurationComplete message to the selected cell in a UL grant (pre-configured UL grant or dynamic UL grant received from the selected cell). The UE stops the LTM supervisor timer, when the UE determines the NW has successfully received its first UL data. In an embodiment, the UE stops the LTM supervisor timer if PDCCH addressed to C-RNTI scheduling UL grant for new transmission is received from the selected cell. In an embodiment, the UE stops the LTM supervisor timer if PDCCH addressed to C-RNTI scheduling new DL TB is received from the selected cell.

In one embodiment the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

In one embodiment, if the configured grant configuration for LTM cell switch is configured and the UE has valid TA (or the UE has estimated TA) for the selected cell, the UE does not initiate random access towards the selected cell. The UE transmits the RRCReconfigurationComplete message to the selected cell in an UL grant (pre-configured UL grant or dynamic UL grant received from the selected cell). The pre-configured UL grant may be received by the UE in the selected cell's LTM configuration (e.g., in step 10 of FIG. 5). The UE stops the LTM supervisor timer when the UE determines the NW (i.e., selected cell) has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell. Otherwise, (e.g., if the configured grant configuration for the LTM cell switch is not configured or if the UE does not have valid TA [or the UE does not have estimated TA] for the selected cell), the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

At step 1510, if attemptCondReconfig is configured (or attemptCondReconfig is configured and set to TRUE) and if there is a suitable cell amongst the (valid) candidate cells in the CHO configuration received from the gNB (the valid candidate cell is the one which is not configured with CondEventT1 or is configured with CondEventT1 but the leaving condition has not been fulfilled; and is the cell for which reconfigurationWithSync is included in the CHO configuration and cell belongs to MCG), the process proceeds to step 1512. Otherwise, the process proceeds to step 1516.

At step 1512, the UE selects that cell while T311 is running. In case multiple candidate cells meet the above criteria, the UE may select the one which has the highest RSRP/RSRQ.

At step 1514, the UE performs CHO execution towards the selected cell. Timer T311 is stopped.

At step 1516, the UE selects a suitable cell while T311 is running Upon selecting the cell, the UE stops T311, starts T301, and initiates transmission of the RRCReestablishmentRequest message towards the selected cell.

Although FIG. 15 illustrates one example of a procedure 1500 for RRC reestablishment, various changes may be made to FIG. 15. For example, while shown as a series of steps, various steps in FIG. 15 could overlap, occur in parallel, occur in a different order, occur any number of times, be omitted, or replaced by other steps.

Figure 16:
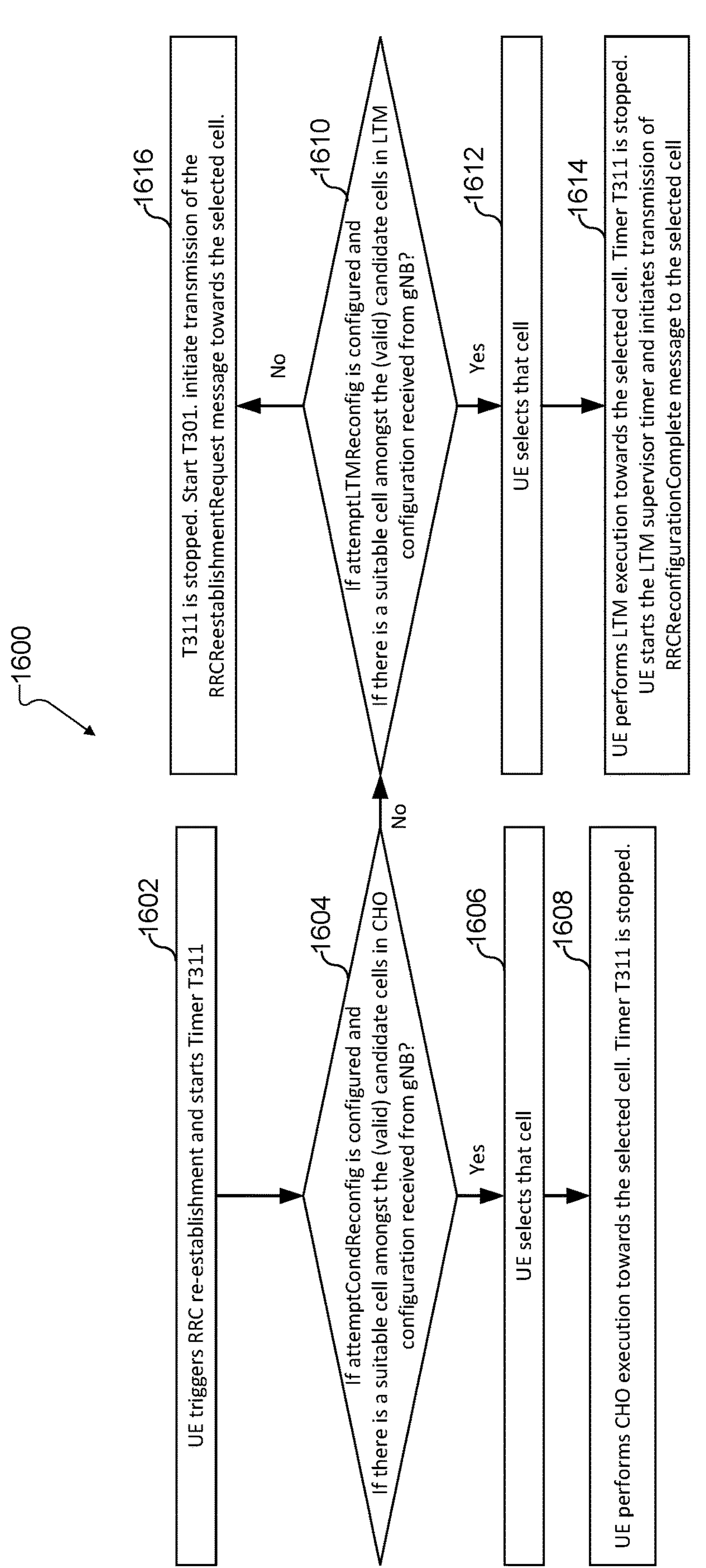
FIG. 16 illustrates another procedure for RRC reestablishment according to embodiments of the present disclosure.

In one embodiment, when an LTM supervisor timer expires such as at step 17 of FIG. 5, the UE performs the operation illustrated in FIG. 16.

FIG. 16 illustrates another procedure 1600 for RRC reestablishment according to embodiments of the present disclosure. An embodiment of the procedure illustrated in FIG. 16 is for illustration only. One or more of the components illustrated in FIG. 16 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In one embodiment, a valid LTM candidate cell is the cell for which a reconfigurationWithSync ltmCellSwitchInfo IE is included in the LTM configuration and the cell belongs to the MCG or alternately, the valid candidate cell is the cell for which the reconfigurationWithSync ltmCellSwitchInfo IE is included in the LTM configuration.

In the example of FIG. 16, the process begins at step 1602. At step 1602, a UE such as UE 502 of FIG. 5 triggers/initiates RRC connection re-establishment and starts Timer T311.

At step 1604, if attemptCondReconfig is configured (or attemptCondReconfig is configured and set to TRUE) and if there is a suitable cell amongst the (valid) candidate cells in the CHO configuration received from the gNB (the valid candidate cell is the one which is not configured with CondEventT1 or is configured with CondEventT1 but the leaving condition has not been fulfilled; and is the cell for which reconfigurationWithSync is included in the CHO configuration and cell belongs to MCG), the process proceeds to step 1606. Otherwise, the process proceeds to step 1610.

At step 1606, the UE selects that cell while T311 is running. In case multiple candidate cells meet the above criteria, the UE may select the one which has the highest RSRP/RSRQ.

At step 1608, the UE performs CHO execution towards the selected cell, and Timer T311 is stopped.

At step 1610, if attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5); or if attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure; or if attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5) and the UE has valid TA of this cell; or if attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure and the UE has valid TA for this cell, the process proceeds to step 1612. Otherwise, the process proceeds to step 1616.

At step 1612, the UE selects that cell while T311 is running. In case multiple candidate cells meet the above criteria, the UE may select the one which has valid TA and/or has the highest RSRP/RSRQ.

At step 1614, the UE initiates LTM execution towards the selected cell, and Timer T311 is stopped. The UE starts the LTM supervisor timer and initiates transmission of a RRCReconfigurationComplete message to the selected cell. If the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. If the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The UE stops the LTM supervisor timer when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell.

In one embodiment, the UE initiates random access towards the selected cell. During the random-access procedure, the UE transmits the RRCReconfigurationComplete message to select the cell in a Msg3 or MsgA. The UE stops the LTM supervisor timer upon successful completion of LTM cell switch i.e., the LTM supervisor timer is stopped when the random-access procedure is successfully completed.

At step 1616, the UE selects a suitable cell while T311 is running. Upon selecting the cell, the UE stops T311, starts T301, and initiates transmission of the RRCReestablishmentRequest message towards the selected cell.

Although FIG. 16 illustrates one example of a procedure 1600 for RRC reestablishment, various changes may be made to FIG. 16. For example, while shown as a series of steps, various steps in FIG. 16 could overlap, occur in parallel, occur in a different order, occur any number of times, be omitted, or replaced by other steps.

Figure 17:
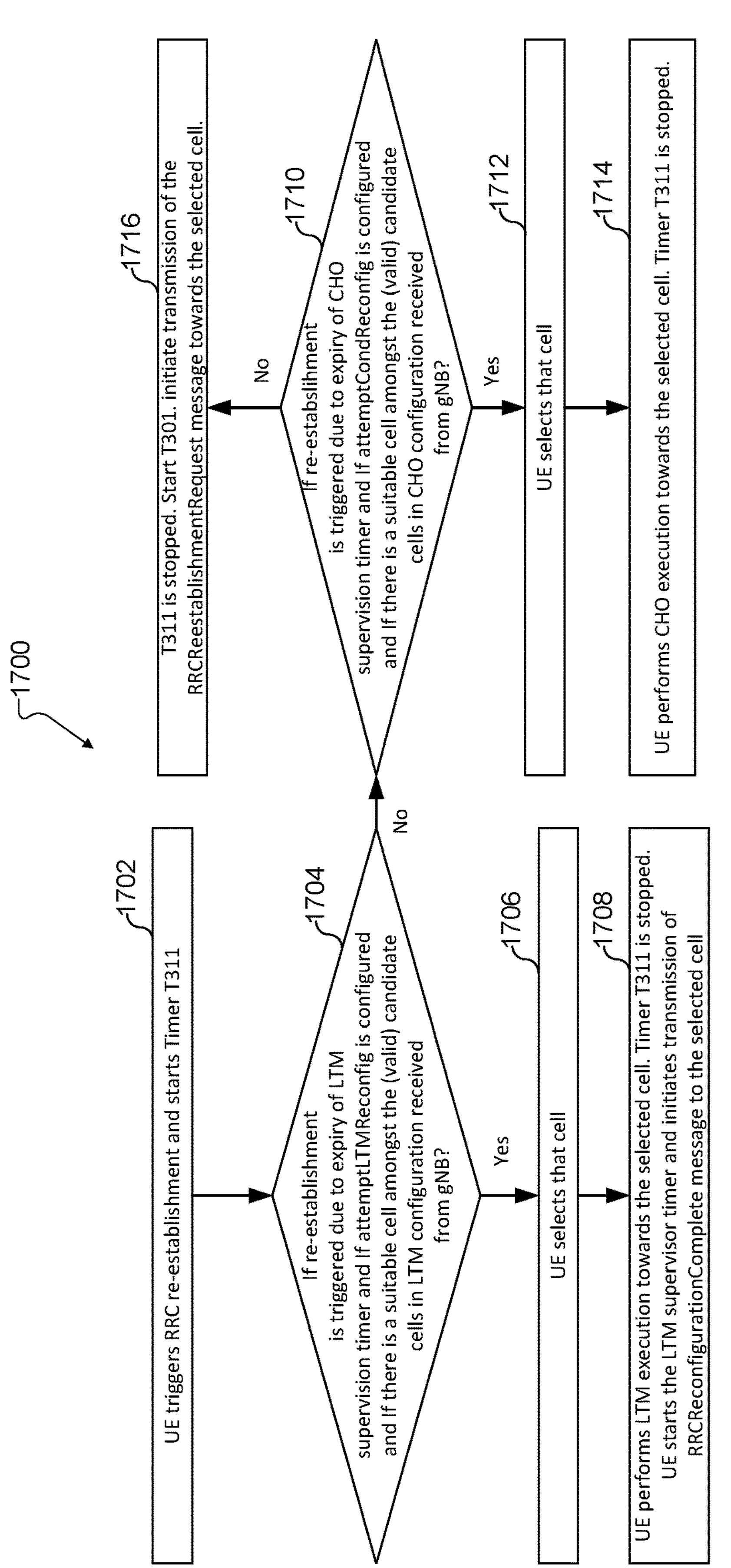
FIG. 17 illustrates another procedure for RRC reestablishment according to embodiments of the present disclosure.

In one embodiment, when an LTM supervisor timer expires such as at step 17 of FIG. 5, the UE performs the operation illustrated in FIG. 17.

FIG. 17 illustrates another procedure 1700 for RRC reestablishment according to embodiments of the present disclosure. An embodiment of the procedure illustrated in FIG. 17 is for illustration only. One or more of the components illustrated in FIG. 17 may be implemented in specialized circuitry configured to perform the noted functions or one or more of the components may be implemented by one or more processors executing instructions to perform the noted functions. Other embodiments for RRC reestablishment could be used without departing from the scope of this disclosure.

In one embodiment, a valid LTM candidate cell is the cell for which a reconfigurationWithSync ltmCellSwitchInfo IE is included in the LTM configuration and the cell belongs to the MCG or alternately, the valid candidate cell is the cell for which the reconfigurationWithSync ltmCellSwitchInfo IE is included in the LTM configuration.

In the example of FIG. 17, the process begins at step 1702. At step 1702, a UE such as UE 502 of FIG. 5 triggers/initiates RRC connection re-establishment and starts Timer T311.

At step 1704, if re-establishment is triggered due to expiry of the LTM supervision timer and if attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5); or if re-establishment is triggered due to expiry of the LTM supervision timer and if attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure; or if re-establishment is triggered due to expiry of the LTM supervision timer and if attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5) and the UE has valid TA of this cell; or if re-establishment is triggered due to expiry of the LTM supervision timer and if attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure and the UE has valid TA for this cell, the process proceeds to step 1706. Otherwise, the process proceeds to step 1710.

At step 1706, the UE selects that cell while T311 is running. In case multiple candidate cells meet the above criteria, the UE may select the one which has valid TA and/or has the highest RSRP/RSRQ.

At step 1708, the UE initiates LTM execution towards the selected cell, and Timer T311 is stopped. The UE starts the LTM supervisor timer and initiates transmission of a RRCReconfigurationComplete message to the selected cell. If the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. If the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The UE stops the LTM supervisor timer when the UE determines the NW has successfully received its first UL data. In one embodiment, the UE stops the LTM supervisor timer if a PDCCH addressed to the C-RNTI scheduling the UL grant for new transmission is received from the selected cell. In one embodiment, the UE stops the LTM supervisor timer if a PDCCH addressed to the C-RNTI scheduling new DL TB is received from the selected cell.

In one embodiment the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

In one embodiment, if a configured grant configuration for LTM cell switch is configured and the UE has valid TA (or the UE has estimated TA) for the selected cell, the UE does not initiate random access towards the selected cell. The UE transmits the RRCReconfigurationComplete message to the selected cell in an UL grant (pre-configured UL grant or dynamic UL grant received from the selected cell). The pre-configured UL grant may be received by UE in the selected cell's LTM configuration (e.g., in step 10 of FIG. 5). The UE stops the LTM supervisor timer, when the UE determines the NW (i.e., selected cell) has successfully received its first UL data. In an embodiment, the UE stops the LTM supervisor timer if a PDCCH addressed to the C-RNTI scheduling the UL grant for new transmission is received from the selected cell. In an embodiment, the UE stops the LTM supervisor timer if a PDCCH addressed to the C-RNTI scheduling new DL TB is received from the selected cell. Otherwise, (e.g., if the configured grant configuration for LTM cell switch is not configured or if the UE does not have valid TA [or the UE does not have estimated TA] for the selected cell), the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

At step 1710, if re-establishment is triggered due to expiry of the CHO supervision timer and if attemptCondReconfig is configured (or attemptCondReconfig is configured and set to TRUE) and if there is a suitable cell amongst the (valid) candidate cells in the CHO configuration received from the gNB (the valid candidate cell is the one which is not configured with CondEventT1 or is configured with CondEventT1 but the leaving condition has not been fulfilled; and is the cell for which reconfigurationWithSync is included in the CHO configuration and cell belongs to MCG), the process proceeds to step 1712. Otherwise, the process proceeds to step 1716.

At step 1712, the UE selects that cell while T311 is running. In case multiple candidate cells meet the above criteria, UE may select the one which has the highest RSRP/RSRQ.

At step 1714, the UE performs CHO execution towards the selected cell, and Timer T311 is stopped.

At step 1716, the UE selects a suitable cell while T311 is running. Upon selecting the cell, the UE stops T311, starts T301, and initiates transmission of the RRCReestablishmentRequest message towards the selected cell.

Although FIG. 17 illustrates one example of a procedure 1700 for RRC reestablishment, various changes may be made to FIG. 17. For example, while shown as a series of steps, various steps in FIG. 17 could overlap, occur in parallel, occur in a different order, occur any number of times, be omitted, or replaced by other steps.

In one embodiment, when an LTM supervisor timer expires such as at step 17 of FIG. 5, the UE performs the following operation:

In one embodiment, a valid LTM candidate cell is the cell for which a reconfigurationWithSync ltm-CellSwitchInfo IE is included in the LTM configuration and the cell belongs to the MCG or alternately, the valid candidate cell is the cell for which the reconfigurationWithSync ltmCellSwitchInfo IE is included in the LTM configuration.

The UE triggers/initiates RRC connection re-establishment and starts Timer T311.

If re-establishment is triggered due to expiry of the LTM supervision timer:

If attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5): or If attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure: or If attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5) and the UE has valid TA of this cell: or If attemptLTMReconfig is configured (or attemptLTMReconfig is configured and set to TRUE) and if there is a suitable cell amongst the (valid) candidate cells (the candidate cell in the LTM configuration for which LTM execution has failed is not considered valid) in the LTM configuration received from the gNB (e.g., in step 10 of FIG. 5) and the gNB has indicated that LTM execution can be performed towards this cell upon LTM failure and the UE has valid TA for this cell:

The UE selects that cell while T311 is running. In case multiple candidate cells meet the above criteria, the UE may select the one which has valid TA and/or has the highest RSRP/RSRQ.

The UE initiates LTM execution towards the selected cell. Timer T311 is stopped.

The UE starts the LTM supervisor timer and initiates transmission of a RRCReconfigurationComplete message to the selected cell.

If the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. If the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The LTM supervisor timer is stopped when the random-access procedure is successfully completed. The UE stops the LTM supervisor timer when the UE determines the NW has successfully received its first UL data.

In one embodiment the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

Otherwise, if attemptCondReconfig is configured (or attemptCondReconfig is configured and set to TRUE) and if there is a suitable cell amongst the (valid) candidate cells in the CHO configuration received from the gNB (the valid candidate cell is the one which is not configured with CondEventT1 or is configured with CondEventT1 but the leaving condition has not been fulfilled; and is the cell for which reconfigurationWithSync is included in the CHO configuration and the cell belongs to the MCG):

The UE selects that cell while T311 is running. In case multiple candidate cells meet the above criteria, the UE may select the one which has the highest RSRP/RSRQ.

The UE performs CHO execution towards the selected cell. Timer T311 is stopped.

Otherwise:

The UE selects a suitable cell while T311 is running.

Upon selecting the cell, the UE stops T311, starts T301 and initiates transmission of the RRCReestablishmentRequest message towards the selected cell.

If re-establishment is triggered due to expiry of the CHO supervision timer:

If attemptCondReconfig is configured (or attemptCondReconfig is configured and set to TRUE) and if there is a suitable cell amongst the (valid) candidate cells in the CHO configuration received from the gNB (the valid candidate cell is the one which is not configured with CondEventT1 or is configured with CondEventT1, but the leaving condition has not been fulfilled; and is the cell for which reconfigurationWithSync is included in the CHO configuration and the cell belongs to the MCG):

The UE selects that cell while T311 is running. In case multiple candidate cells meet the above criteria, the UE may select the one which has the highest RSRP/RSRQ.

The UE performs CHO execution towards the selected cell. Timer T311 is stopped.

Otherwise, if attemptLTMReconfig is configured (or attemptLTMReconfig is configured and set to TRUE) and if there is a suitable cell amongst the (valid) candidate cells (the candidate cell in LTM configuration for which LTM execution has failed is not considered valid) in the LTM configuration received from the gNB (e.g., in step 10 of FIG. 5): or if attemptLTMReconfig is configured (or attemptLTMReconfig is configured and set to TRUE) and if there is a suitable cell amongst the (valid) candidate cells (the candidate cell in LTM configuration for which LTM execution has failed is not considered valid) in the LTM configuration received from the gNB (e.g., in step 10 of FIG. 5) and the gNB has indicated that LTM execution can be performed towards this cell upon LTM failure: or if attemptLTMReconfig is configured (or attemptLTMReconfig is configured and set to TRUE) and if there is a suitable cell amongst the (valid) candidate cells (the candidate cell in LTM configuration for which LTM execution has failed is not considered valid) in the LTM configuration received from the gNB (e.g., in step 10 of FIG. 5) and the UE has valid TA of this cell: or if attemptLTMReconfig is configured (or attemptLTMReconfig is configured and set to TRUE) and if there is a suitable cell amongst the (valid) candidate cells (the candidate cell in LTM configuration for which LTM execution has failed is not considered valid) in the LTM configuration received from the gNB (e.g., in step 10 of FIG. 5) and the gNB has indicated that LTM execution can be performed towards this cell upon LTM failure, and the UE has valid TA for this cell:

The UE selects that cell while T311 is running. In case multiple candidate cells meet the above criteria, the UE may select the one which has valid TA and/or has the highest RSRP/RSRQ.

The UE initiates LTM execution towards the selected cell. Timer T311 is stopped.

The UE starts the LTM supervisor timer and initiates transmission of a RRCReconfigurationComplete message to the selected cell.

If the UE does not have valid TA for the selected cell, the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed. If the UE has valid TA for the selected cell, the UE does not initiate random access towards the selected cell. The UE transmits the RRCReconfigurationComplete message to the selected cell in an UL grant (pre-configured UL grant or dynamic UL grant received from the selected cell). The LTM supervisor timer is stopped when the random-access procedure is successfully completed. The UE stops the LTM supervisor timer when the UE determines the NW has successfully received its first UL data.

In one embodiment the UE initiates random access towards the selected cell. During the random-access procedure, the UE transmits the RRCReconfigurationComplete message to the selected cell in a Msg3 or MsgA. The UE stops the LTM supervisor timer upon successful completion of LTM cell switch i.e., the LTM supervisor timer is stopped when the random-access procedure is successfully completed.

Otherwise:

The UE selects a suitable cell while T311 is running.

Upon selecting the cell, The UE stops T311, starts T301 and initiates transmission of the RRCReestablishmentRequest message towards the selected cell.

In any of the above embodiments when RRC Connection Re-establishment is triggered, the UE may perform the following:

stop timer T310, if running;

stop timer T312, if running;

stop timer T304, if running;

start timer T311;

stop timer T316, if running;

if the UE is not configured with attemptCondReconfig and attemptLTMReconfig (or if RRC Connection Re-establishment is triggered due to LTM supervision timer expiry and if the UE is not configured with attemptLTTMReconfig or if RRC Connection Re-establishment is triggered due to LTM supervision timer expiry and the UE is not able to select cell for LTM execution as described in the embodiments):

reset MAC;

release spCellConfig, if configured;

suspend all RBs, and BH RLC channels for IAB-MT, and Uu Relay RLC channels for L2 U2N Relay UE, except SRB0 and broadcast MRBs;

release the MCG SCell(s), if configured;

if MR-DC is configured:

perform MR-DC release;

release delayBudgetReportingConfig, if configured and stop timer T342, if running;

release overheatingAssistanceConfig, if configured and stop timer T345, if running;

release idc-AssistanceConfig, if configured;

release btNameList, if configured;

release wlanNameList, if configured;

release sensorNameList, if configured;

release drx-PreferenceConfig for the MCG, if configured and stop timer T346a associated with the MCG, if running;

release maxBW-PreferenceConfig for the MCG, if configured and stop timer T346b associated with the MCG, if running;

release maxCC-PreferenceConfig for the MCG, if configured and stop timer T346c associated with the MCG, if running;
release maxMIMO-LayerPreferenceConfig for the MCG, if configured and stop timer T346d associated with the MCG, if running;
release minSchedulingOffsetPreferenceConfig for the MCG, if configured stop timer T346e associated with the MCG, if running;
release rlm-RelaxationReportingConfg for the MCG, if configured and stop timer T346j associated with the MCG, if running;
release bfd-RelaxationReportingConfig for the MCG, if configured and stop timer T346k associated with the MCG, if running;
release releasePreferenceConfig, if configured stop timer T346f, if running;
release onDemandSIB-Request if configured, and stop timer T350, if running;
release reference TimePreferenceReporting, if configured;
release sl-AssistanceConfigNR, if configured;
release obtainCommonLocation, if configured;
release musim-GapAssistanceConfig, if configured and stop timer T346h, if running;
release musim-LeaveAssistanceConfig, if configured;
release ul-GapFR2-PreferenceConfig, if configured;
release scg-DeactivationPreferenceConfig, if configured, and stop timer T346i, if running;
release propDelayDiffReportConfig, if configured;
release rrm-MeasRelaxationReportingConfig, if configured;
release maxBW-PreferenceConfigFR2-2, if configured;
release maxMIMO-LayerPreferenceConfigFR2-2, if configured;
release minSchedulingOffsetPreferenceConfigExt, if configured;
release successHO-Config, if configured;
if any DAPS bearer is configured:
reset the source MAC and release the source MAC configuration;
for each DAPS bearer:
release the RLC entity or entities, and the associated logical channel for the source SpCell;
reconfigure the PDCP entity to release DAPS;
for each SRB:
release the PDCP entity for the source SpCell;
release the RLC entity and the associated logical channel for the source SpCell;
release the physical channel configuration for the source SpCell;
discard the keys used in the source SpCell (the $K_{gNB}$ key, the $K_{RRCenc}$ key, the $K_{RRCint}$ key, the $K_{UPint}$ key and the $K_{UPenc}$ key), if any;
perform cell selection.

In one embodiment if the LTM cell switch is ongoing and if the LTM cell switch is triggered by the LTM Cell Switch Command MAC CE; and if an SSB (or CSI RS or any other RS) corresponding to the configured UL grant (in the configured grant configuration received from the gNB for LTM cell switching) has the same SSB (or CSI RS or any other RS) index as the SSB (or CSI RS or any other RS) indicated by LTM Cell Switch Command MAC CE, the UE selects the SSB (or CSI RS or any other RS) indicated by the LTM Cell Switch Command MAC CE, indicates the SSB (or CSI RS or any other RS) index to the lower layer i.e., physical layer and considers this configured uplink grant as valid. This configured UL grant can be used for transmitting reconfiguration complete message and/or data of one or more radio bearers/logical channels/MAC CEs. Note that configured grant can be associated with one or more SSBs (or CSI RSs or any other RSs) and this association is signaled by gNB in configured grant configuration. Otherwise, if the LTM cell switch is ongoing and if the LTM cell switch is triggered by an upper layer (i.e., upon radio link failure or upon failure of LTM cell switch e.g., LTM supervision timer expiry); and if at least one SSB (or CSI RS or any other RS) corresponding to the configured UL grant (in the configured grant configuration received from the gNB for LTM cell switching) with a RSRP above the configured threshold (e.g., cg-LTM-RSRP-Threshold) is available, the UE indicates the SSB (or CSI RS or any other RS) index corresponding to the configured uplink grant to the lower layer i.e., physical layer, and considers this configured uplink grant as valid. This configured UL grant can be used for transmitting a reconfiguration complete message and/or data of one or more radio bearers/logical channels/MAC CEs. Otherwise, the UE considers this configured uplink grant as not valid.

In one embodiment, for an uplink grant configured for configured grant Type 1 for LTM cell switch, the MAC entity shall:
if, LTM Cell switch is ongoing:
if this LTM cell switch is triggered by the LTM Cell Switch Command MAC CE:
If a SSB is indicated by the LTM Cell Switch Command MAC CE and if a SSB corresponding to the configured UL grant has the same SSB index as the SSB indicated by the LTM Cell Switch Command MAC CE:
select the SSB indicated by LTM Cell Switch Command MAC CE.
indicate the SSB index to the lower layer;
consider this configured uplink grant as valid.
If a SSB is not indicated by the LTM Cell Switch Command MAC CE and if at least one SSB corresponding to the configured UL grant with SS-RSRP above the cg-LTM-RSRP-Threshold-SSB is available:
select the SSB with SS-RSRP above the cg-LTM-RSRP-ThresholdSSB.
indicate the SSB index of selected SSB to the lower layer;
consider this configured uplink grant as valid.
Otherwise, if this LTM cell switch is triggered by an upper layer (i.e., upon radio link failure or upon failure of LTM cell switch):
if at least one SSB corresponding to the configured UL grant with SS-RSRP above the cg-LTM-RSRP-ThresholdSSB is available:
indicate the SSB index corresponding to the configured uplink grant to the lower layer;
consider this configured uplink grant as valid.
Otherwise:
consider this configured uplink grant as not valid.

In an embodiment, for an uplink grant configured for configured grant Type 1 for LTM cell switch, the MAC entity shall:
if LTM Cell switch is ongoing:
if this LTM cell switch is triggered by the LTM Cell Switch Command MAC CE:
if a SSB/CSIRS/TRS corresponding to the configured UL grant has the same SSB/CSIRS/TRS index as the SSB/CSIRS/TRS indicated by the LTM Cell Switch Command MAC CE:

select the SSB/CSIRS/TRS indicated by the LTM Cell Switch Command MAC CE.

indicate the SSB/CSIRS/TRS index to the lower layer;

consider this configured uplink grant as valid.

Otherwise, if this LTM cell switch is triggered by an upper layer (i.e., upon radio link failure or upon failure of LTM cell switch)

if at least one SSB/CSIRS/TRS corresponding to the configured UL grant with RSRP above the cg-LTM-RSRP-Threshold is available:

indicate the SSB/CSIRS/TRS index corresponding to the configured uplink grant to the lower layer;

consider this configured uplink grant as valid.

Otherwise:

consider this configured uplink grant as not valid.

In one embodiment, for an uplink grant configured for configured grant Type 1 for LTM cell switch, the MAC entity shall:

if LTM Cell switch is ongoing:

if this LTM cell switch is triggered by the LTM Cell Switch Command MAC CE and If a SSB is indicated by the LTM Cell Switch Command MAC CE and if a SSB corresponding to the configured UL grant has the same SSB index as the SSB indicated by the LTM Cell Switch Command MAC CE:

select the SSB indicated by LTM Cell Switch Command MAC CE.

indicate the SSB index to the lower layer;

consider this configured uplink grant as valid.

Otherwise:

consider this configured uplink grant as not valid.

It is to be noted that the LTM Cell Switch Command MAC CE may indicate TCI state index, and a TCI state corresponding to this TCI state index may be associated with a SSB or TRS or CSI RS. The mapping of the TCI state to the SSB or TRS or CSI RS is signaled in a RRCReconfiguration message.

Figure 18:
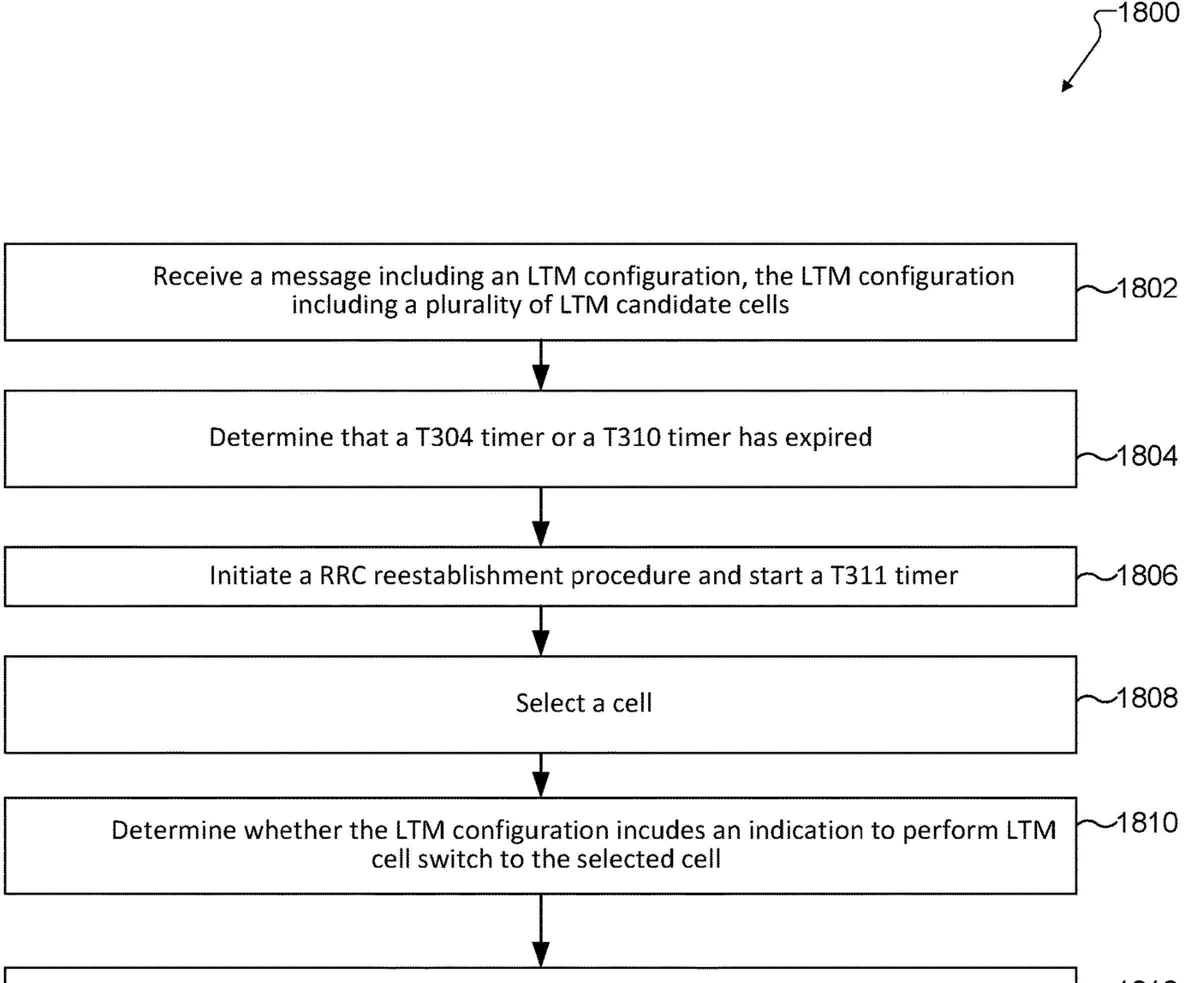
FIG. 18 illustrates a method for RRC reestablishment according to embodiments of the present disclosure.

FIG. 18 illustrates a method 1800 for RRC reestablishment according to embodiments of the present disclosure. An embodiment of the method illustrated in FIG. 18 is for illustration only. One or more of the components illustrated in FIG. 18 may be implemented in specialized circuitry configured to perform the noted functions or one or more of the components may be implemented by one or more processors executing instructions to perform the noted functions. Other embodiments for RRC reestablishment could be used without departing from the scope of this disclosure.

The example of FIG. 18, method 1800 begins at step 1802. At step 1802, a UE, such as UE 502 of FIG. 5 receives a message including an LTM configuration. The LTM configuration includes a plurality of LTM candidate cells. At step 1804, the UE determines that a T304 time or T310 time has expired. At step 1806, the LIE initiates a RRC reestablishment procedure and starts a T311 timer. At step 1808, the LIE selects a cell. At step 1810, the LIE determines whether the LTM configuration includes an indication to perform LTM cell switch to the selected cell. Finally, at step 1812, the UE determines whether the selected cell is one of the plurality of LTM candidate cells.

Although FIG. 18 illustrates one example of a method 1800 for RRC reestablishment, various changes may be made to FIG. 18. For example, while shown as a series of steps, various steps in FIG. 18 could overlap, occur in parallel, occur in a different order, occur any number of times, be omitted, or replaced by other steps.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. A user equipment (UE) comprising:

a transceiver configured to receive a message including a layer 1/layer 2 (L1/L2)-triggered mobility (LTM) configuration, the LTM configuration including a plurality of LTM candidate cells; and a processor operatively coupled to the transceiver, the processor configured to:

determine that a T304 timer or a T310 timer has expired, based on the determination that the T304 timer or the T310 timer has expired, initiate a radio resource control (RRC) re-establishment procedure and start an RRC reestablishment (T311) timer, select a cell while the T311 timer is running, determine whether the LTM configuration includes an indication to perform LTM cell switch to the selected cell, and determine whether the selected cell is one of the plurality of LTM candidate cells in the LTM configuration.

2. The UE of claim 1, wherein if the LTM configuration does not include the indication or the selected cell is not one of the plurality of LTM candidate cells in the LTM configuration:

the processor is further configured to:

stop the T311 timer, and start an RRC reestablishment request timer; and the transceiver is further configured to transmit an RRC reestablishment request message to the selected cell.

3. The UE of claim 1, wherein if the LTM configuration does not include the indication or the selected cell is not one of the plurality of LTM candidate cells in the LTM configuration:

the processor is further configured to:

determine whether a conditional handover configuration includes an indication to perform conditional handover to the selected cell, the conditional handover configuration including a plurality of candidate cells, determine whether the selected cell is one of the plurality of candidate cells in the conditional handover configuration, and if the conditional handover configuration includes the indication to perform conditional handover to the selected cell and the selected cell is one of the plurality of candidate cells in the conditional handover configuration, perform conditional handover to the selected cell.

4. The UE of claim 3, wherein if the selected cell is not one of the LTM candidate cells in the LTM configuration and if the selected cell is not one of the plurality of candidate cells in the conditional handover configuration:

the processor is further configured to:

stop the T311 timer, and start an RRC reestablishment request timer; and the transceiver is further configured to transmit an RRC reestablishment request message to the selected cell.

5. The UE of claim 1 wherein if the LTM configuration includes indication to perform LTM cell switch to the selected cell and the selected cell is one of the plurality of LTM candidate cells in the LTM configuration:

the processor is further configured to:

stop the T311 reestablishment timer, and start the T304 timer; and the transceiver is further configured to transmit an RRCReconfigurationComplete message to the selected cell.

6. The UE of claim 1, wherein if the LTM configuration includes the indication to perform LTM cell switch to the selected cell and the selected cell is one of the plurality of LTM candidate cells in the LIM configuration and this is a first cell selection after the expiry of the T310 timer or the T304 timer:

the processor is further configured to:

stop the T311 timer, and start the T304 timer; and the transceiver is further configured to transmit an RRCReconfigurationComplete message to the selected cell.

7. The UE of claim 1, wherein to determine whether the LTM configuration includes the indication to perform LTM cell switch to the selected cell, the processor is further configured to determine that the LTM configuration includes a parameter for the indication.

8. The UE of claim 7, wherein to determine whether the LTM configuration includes the indication to perform LTM cell switch to the selected cell, the processor is further configured to determine that the parameter for the indication is set to true.

9. A method of operating a user equipment (UE), the method comprising:

receiving a message including a layer 1/layer 2 (L1/L2)-triggered mobility (LTM) configuration, the LTM configuration including a plurality of LTM candidate cells;

determining that a T304 timer or a T310 timer has expired;

based on the determination that the T304 timer or the T310 timer has expired, initiating a radio resource control (RRC) re-establishment procedure and starting an RRC reestablishment (T311) timer;

selecting a cell while the T311 timer is running;

determining whether the LTM configuration includes an indication to perform LTM cell switch to the selected cell; and determining whether the selected cell is one of the plurality of LTM candidate cells in the LTM configuration.

10. The method of claim 9, wherein if the LTM configuration does not include the indication or the selected cell is not one of the plurality of LTM candidate cells in the LTM configuration, the method further comprises:

stopping the T311 timer;

starting an RRC reestablishment request timer; and transmitting an RRC reestablishment request message to the selected cell.

11. The method of claim 9, wherein if the LTM configuration does not include the indication or the selected cell is not one of the plurality of LTM candidate cells in the LTM configuration, the method further comprises:

determining whether a conditional handover configuration includes an indication to perform conditional handover to the selected cell, the conditional handover configuration including a plurality of candidate cells;

determining whether the selected cell is one of the plurality of candidate cells in the conditional handover configuration; and if the conditional handover configuration includes the indication to perform conditional handover to the selected cell and the selected cell is one of the plurality of candidate cells in the conditional handover configuration, performing conditional handover to the selected cell.

12. The method of claim 11, wherein if the selected cell is not one of the plurality of LTM candidate cells in the LTM configuration and if the selected cell is not one of the plurality of candidate cells in the conditional handover configuration, the method further comprises:

stopping the T311 timer;

starting an RRC reestablishment request timer; and transmitting an RRC reestablishment request message to the selected cell.

13. The method of claim 9 wherein if the LTM configuration includes indication to perform LTM cell switch to the selected cell and the selected cell is one of the plurality of LTM candidate cells in the LTM configuration, the method further comprises:

stopping the T311 reestablishment timer;

starting the T304 timer; and transmitting an RRCReconfigurationComplete message to the selected cell.

14. The method of claim 9, wherein if the LTM configuration includes the indication to perform LTM cell switch to the selected cell and the selected cell is one of the plurality of LTM candidate cells in the LTM configuration and this is a first cell selection after the expiry of the T310 timer or the T304 time, the method further comprises:

stopping the T311 timer;

starting the T304 timer; and transmitting an RRCReconfigurationComplete message to the selected cell.

15. The method of claim 9, wherein determining whether the LTM configuration includes the indication to perform LTM cell switch to the selected cell comprises determining that the LTM configuration includes a parameter for the indication.

16. The method of claim 15, wherein determining whether the LTM configuration includes the indication to perform LTM cell switch to the selected cell comprises determining that the parameter for the indication is set to true.

* * * * *